United States Patent [19]
Wells et al.

[11] Patent Number: 5,467,164
[45] Date of Patent: Nov. 14, 1995

[54] DOCUMENT PROCESSING SYSTEM HAVING A STRAIGHT LINE DOCUMENT PATH

[75] Inventors: Thomas R. Wells, Crystal Lake; Leo DaPrato, Mt. Prospect; Paul Friedrich; Kenneth Hendrickson, both of Glenview; Merv LaRue, Barrington, all of Ill.; John Overman, Fort Pierce, Fla.; Duane Patuszynski, Lincolnwood, Ill.; Dale Plum, Arlington Heights, Ill.; Al Rabin, Wood Dale, Ill.; Stuart Schwalb, Buffalo Grove, Ill.; Dan Solomon, Evanston, Ill.; Larry Turner, Lake Zurich, Ill.; David Briggs, Bartlett, Ill.; Herb Hausmann, Lincolnshire, Ill.

[73] Assignee: Bell & Howell Document Management Products Company, Chicago, Ill.

[21] Appl. No.: 80,908

[22] Filed: Jun. 21, 1993

[51] Int. Cl.⁶ .......................... G03B 27/32; G03B 27/52
[52] U.S. Cl. .................... 355/23; 355/51; 355/66
[58] Field of Search .................... 355/23, 24, 43, 355/51, 60, 65, 66; 271/10

[56] References Cited

U.S. PATENT DOCUMENTS

| | | |
|---|---|---|
| 2,578,320 | 12/1951 | Schubert ........................ 355/23 |
| 3,568,584 | 3/1971 | Harvey . |
| 3,885,871 | 5/1975 | Galatha et al. . |
| 3,936,171 | 2/1976 | Brooke . |
| 4,049,257 | 9/1977 | Frystak . |
| 4,062,533 | 12/1977 | Greenberg et al. .............. 271/10 |
| 4,087,175 | 5/1978 | Johnson . |
| 4,123,157 | 10/1978 | Klose et al. . |
| 4,148,579 | 4/1979 | Axelrod et al. . |
| 4,153,361 | 5/1979 | Axelrod . |
| 4,175,719 | 11/1979 | Speckman et al. . |
| 4,190,353 | 2/1980 | LaRue, Jr. . |
| 4,198,157 | 4/1980 | Johnson . |
| 4,255,026 | 3/1981 | Ebener, Jr. . |
| 4,278,023 | 7/1981 | Call et al. . |
| 4,303,234 | 12/1981 | Plum . |
| 4,332,466 | 6/1982 | Flasck . |

(List continued on next page.)

OTHER PUBLICATIONS

Bell & Howell Document Management Products Company, MicroTrak Camera Specifications, 1992.
Bell & Howell Document Management Products Company, MicroTrak CX Microfilm Camera Specifications, 1991.
Bell & Howell Document Management Products Company, Image Trak Camera Specifications, 1992.

*Primary Examiner*—Richard A. Wintercorn
*Attorney, Agent, or Firm*—Willian Brinks Hofer Gilson & Lione

[57] ABSTRACT

A document processing system for performing multiple document processing tasks while the documents travel in a straight line document path is provided. The document processing system may include a transport system for transporting the documents in a straight line path, a sensing system for sensing the presence of the document, an optical system for projecting the image of the document, a camera module for receiving the projected image and storing it onto film, a film marking system for placing blips on the film adjacent the document image, a film numbering system for placing alphanumeric characters on the film adjacent the document image, an endorsing system for placing a printed endorsement on one side of the document, an electro-optical scanning system for scanning the image of the document processing the signal into a bit mapped image or for use with external communications devices, scanning for bar code symbology, and imprinting characters on the documents.

A machine having a transport system to serially move documents in a straight line path and having one or more of the systems is provided and can be serially linked to another like machine so that the exit of a first machine is the inlet to the second machine.

23 Claims, 22 Drawing Sheets

U.S. PATENT DOCUMENTS

| | | |
|---|---|---|
| 4,382,675 | 5/1983 | Marshall . |
| 4,484,521 | 11/1984 | Frystak et al. . |
| 4,501,487 | 2/1985 | McCormick-Goodhart . |
| 4,506,301 | 3/1985 | Kingsley et al. . |
| 4,571,636 | 2/1986 | Itoh .................................... 358/285 |
| 4,624,558 | 11/1986 | Johnson . |
| 4,634,071 | 1/1987 | Hertel . |
| 4,653,890 | 3/1987 | Nordstrom et al. . |
| 4,697,919 | 10/1987 | Hertel . |
| 4,725,893 | 2/1988 | Granger . |
| 4,734,742 | 3/1988 | Klumpp et al. ....................... 355/23 |
| 4,806,958 | 2/1989 | Momot et al. . |
| 4,806,959 | 2/1989 | Townsend . |
| 4,806,960 | 2/1989 | Momot et al. . |
| 4,811,058 | 3/1989 | LaCourt . |
| 4,921,320 | 5/1990 | DeJager et al. . |
| 4,956,547 | 9/1990 | Mita . |
| 4,969,009 | 11/1990 | Sugiyama et al. ....................... 355/64 |
| 4,984,008 | 1/1991 | Frystak et al. . |
| 5,030,978 | 7/1991 | Stoneham et al. . |
| 5,035,415 | 7/1991 | Lee et al. . |
| 5,182,991 | 2/1993 | Patuszynski et al. . |
| 5,208,627 | 5/1993 | Yoshihara et al. ....................... 355/23 |

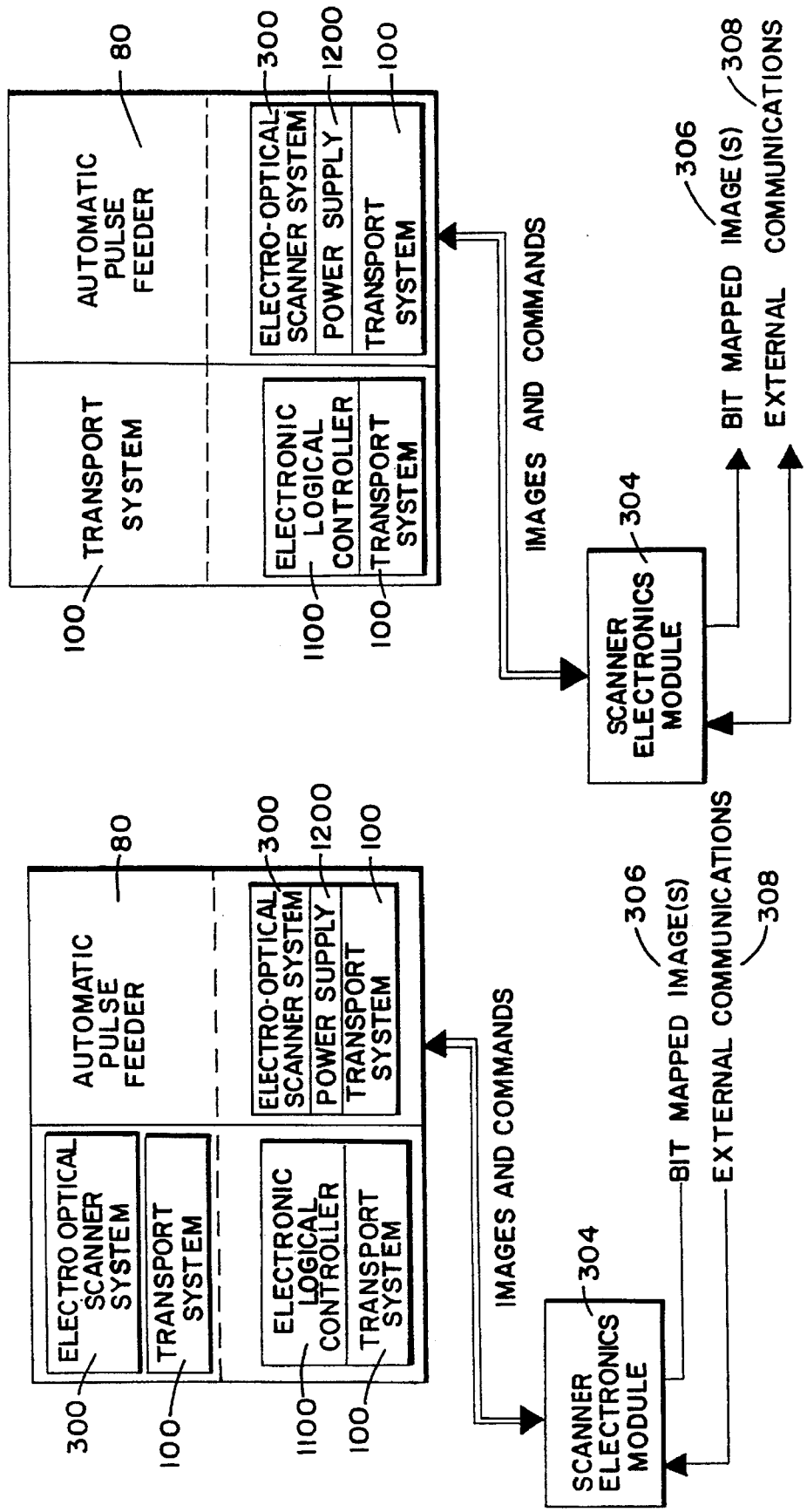

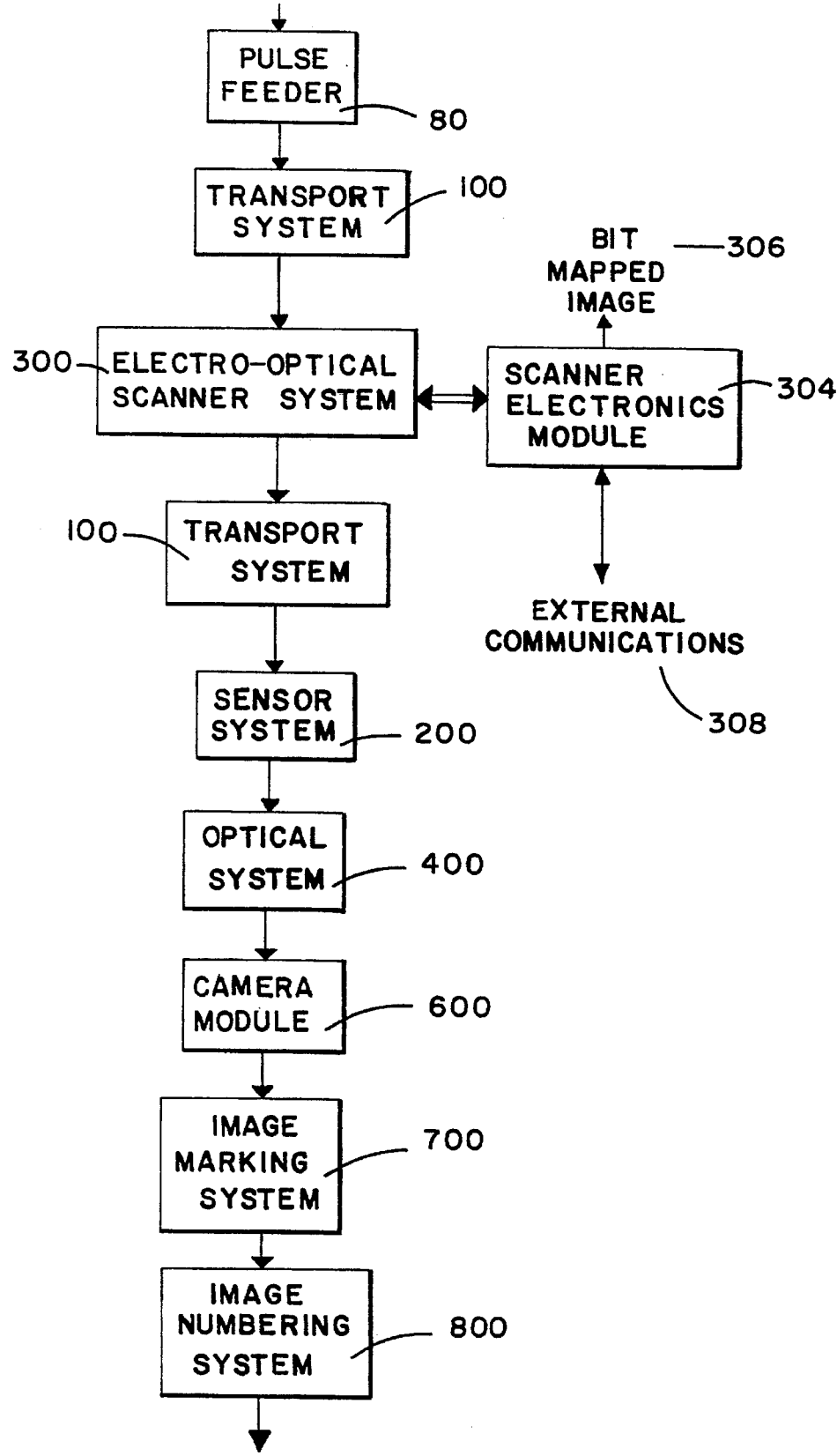

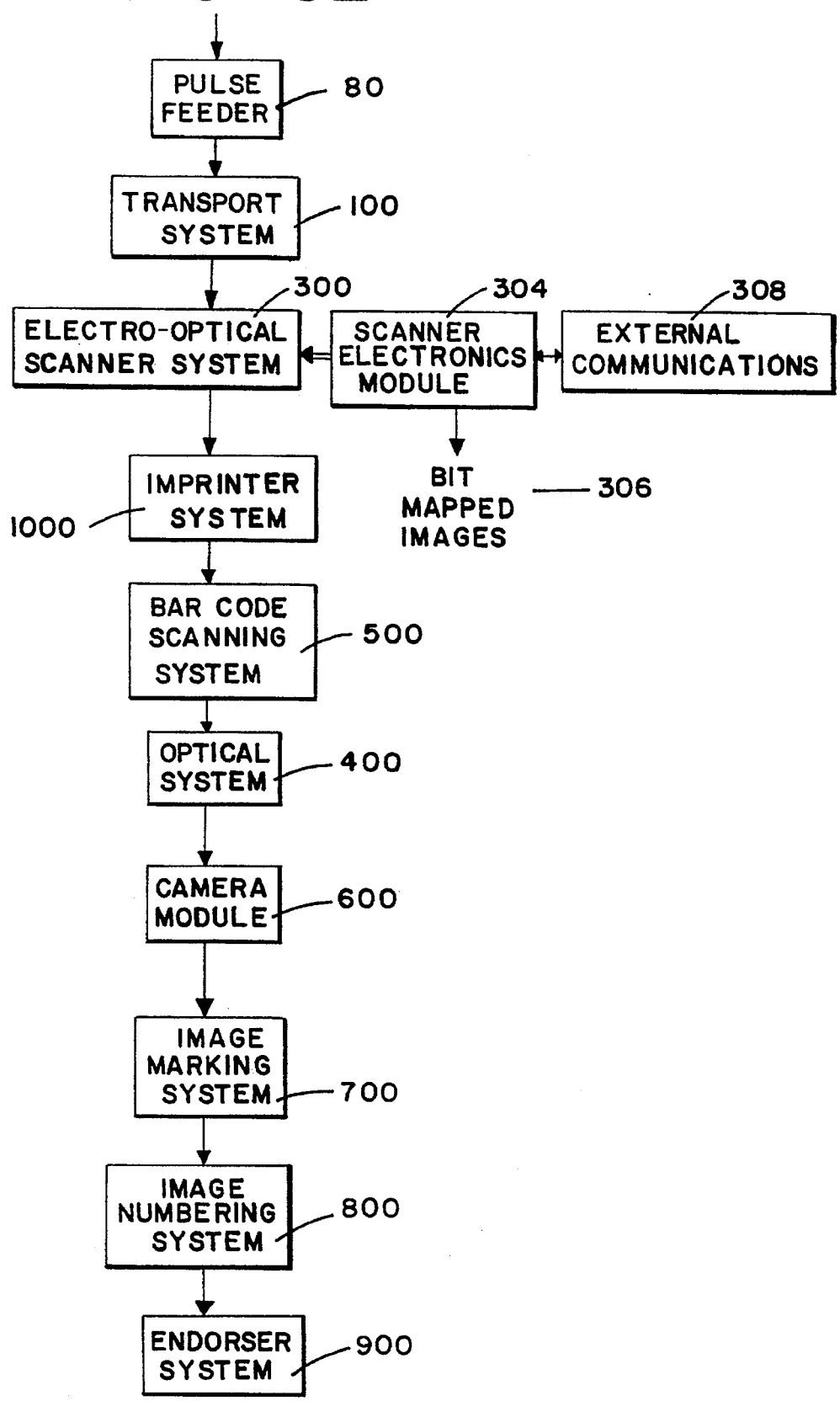

DOCUMENT PROCESSING SYSTEM HAVING A STRAIGHT LINE DOCUMENT PATH

BACKGROUND OF THE INVENTION

This invention relates to an document processing system and an apparatus capable of performing multiple tasks while the documents travel in a straight line document path. More particularly, the invention relates to one or more similar machines having removable modules each capable of performing tasks suitable for processing documents while the documents travel in a straight line document path. Such tasks include, transporting, optically scanning, scanning for bar code symbology, imprinting, filming, marking or numbering the film, endorsing, and stacking the documents.

Document processing machines such as feeders, scanners, filmers, endorsers, and the like are known to exist as separate machines. It is desirable, however, to be able to provide one or more of these functions in a single machine or in a series of like machines, so that each machine is compact, easy to assemble, and to use.

The present invention provides a machine housing that can receive one or more modules suitable for use in processing documents. Advantageously, one machine can be linked serially to another machine to provide a continuous straight document path so that a wide variety of document processing functions can be performed in a single pass without the document having to travel in a serpentine path.

One problem with known document processing machines, particularly known filming machines, including rotary type camera machines, is that they turn the document over or they transport the document in a serpentine path so that both sides of the document can be exposed or filmed. For example, U.S. Pat. No. 4,190,353 shows a rotary type of microfilm recording device that uses belts and rollers to move the document through the machine. The document is fed in a horizontal position, moved to a vertical position, filmed, and returned to a horizontal position. A perceived problem with moving the document in different directions is that the document may become jammed in the area where it changes direction or it may be dislodged and propelled from the belts and rollers into the housing.

Accordingly, it is desirable to provide a straight through paper path to reduce the potential for jamming and lost documents. U.S. Pat. No. 4,734,742 shows an electro-optical scanner capable of scanning both sides of the document at the same time using a straight paper path. One problem with this machine is that it is not known how a document can be retrieved should it become stuck or lodged within the rollers. The machine of the present invention, provides a clam-shell type housing having a top portion hinged at its rear to a bottom portion so that the transport system and thus any documents within the transport system may be easily viewed and obtained by the user.

Where the documents to be processed are bank checks there is a need to endorse the check as well as optically recording or filming it. Although document endorsers, including those that also fill the document, are known in the prior art, there are two potential drawbacks to these endorsers. One drawback is that the Federal Reserve Bank has issued regulations mandating specific, discrete locations for particular bank endorsements. Under the new regulations, the reverse side of the check is divided into three portions. The size of each portion is dictated by federal regulations. The payee's endorsement is permitted only in the left-hand portion of the reverse side of the check. The endorsement of the bank of first deposit is then permitted only in the center portion of the check. Any subsequent bank's endorsement is permitted only in the right-hand portion of the check.

Consequently, there is a need for an endorser unit that will endorse in positions other than the conventional, central endorsement position. U.S. Pat. No. 5,182,991, assigned to the present assignee and incorporated herein by reference, shows a document recorder having a multi-position incremental document endorser that permits endorsement in each of three discrete locations along the length of the reverse side of a check. In its preferred embodiment, the disclosed document recorder provides a serpentine document path so that the document changes direction from a horizontal position to a vertical position for filming. The present invention seeks to avoid the serpentine path typically used with such endorsers.

Other processing functions known to be useful in filming documents may also be provided. For example, counting the documents, indexing of a batch of documents, image marking, imprinting characters or indicia, optically scanning the documents, bar code scanning to read bar code symbologies, and the like may be provided in one or more successive like machines. U.S. Pat. No. 4,984,008 which is fully incorporated herein by reference shows a system to record numbers and/or indicia that may relate to the document simultaneously with filming the document.

SUMMARY OF THE INVENTION

The present invention provides a machine having a document transport system to serially move documents serially along a generally straight line document path from the inlet to the outlet. The machine has an upper portion and a lower portion to define an area of document travel. The upper and lower portions have a front, a rear, a first side, and a second side with the first side defining an inlet to the machine and the second side defining an outlet. The rear of the upper portion is hinged to the rear of the lower portion so that the machine can be easily opened.

The machine may incorporate any of several systems useful for processing documents while the document travels in a straight line document path. For example, the machine may include a sensor system for sensing the presence of the document, an optical system for projecting the image from at least one side of the document to an aperture orthogonal to the document path, and a removable camera module having a lens with an optical axis and film such that the when the camera module is attached to the apparatus, the lens is aligned with the aperture to receive the image from the optical system. The machine may also include a film marking system and a film numbering system that cooperate with the camera module to provide blips and alphanumeric characters on the film adjacent the document image. An endorsing system to imprint a single endorsement on one side of the document may also be provided.

The machine may also include an electro-optical scanning system for optically scanning one or both sides of the document, a bar code scanning system for optically scanning bar code symbology printed on the document, an imprinting system for imprinting characters on the document.

According to the present invention, the machine can be serially linked with other like machines such that the exit of the first machine (the machine first receiving the documents) substantially abuts the entrance to the second machine (the machine downstream of the first machine) to provide a lengthened straight line document path. As a result, the first machine can include systems not provided in the second machine. For example, the first machine can include an electro-optical scanning system, a bar code scanning system, an imprinting system or any combination of one or more of the systems. In this way, the second machine can include a camera module for filming the documents, a marking system, a numbering system, an endorsing system or any combination of one or more of these systems.

In one embodiment of the present invention a document processing machine is provided with an inlet and an outlet and includes a document transport system having opposed transport members for moving documents serially along a generally straight line document path from the inlet to the outlet, an optical system located between the inlet and the outlet and having a pair of mirrors to direct the image from one side of the document to an aperture orthogonal to the document path, and a removable camera module having a lens with an optical axis and film such that the when the camera module is attached to the apparatus, the lens is aligned with the aperture to receive the image from the optical system.

In accordance with the present invention, a document processing system is provided that performs multiple document processing tasks while the documents travel in a straight line document path. The document processing system may include a transport system for transporting the documents in a straight line path, a sensing system for sensing the presence of the document, an optical system for projecting the image of the document, a camera module for receiving the projected image and storing it onto film, a film marking system for placing blips on the film adjacent the document image, a film numbering system for placing alphanumeric characters on the film adjacent the document image, an endorsing system for placing a printed endorsement on one side of the document, an electro-optical scanning system for scanning the image of the document processing the signal into a bit mapped image or for use with external communications devices, a bar code scanning system for scanning bar code symbologies, an imprinting system for printing characters on the documents, or any combination of one or more systems.

BRIEF DESCRIPTION OF THE DRAWINGS

FIG. 19 is a schematic flow diagram showing another embodiment of a document processing system wherein the machine of FIG. 1 may be used.

FIG. 20 is a schematic flow diagram showing another embodiment of a document processing system wherein the machine of FIG. 1 may be used.

FIG. 31 is a flow diagram of an embodiment of a document processing system.

FIG. 32 is a flow diagram of an embodiment of a document processing system.

With reference to FIGS. 1–14, it is to be understood that they are not necessarily drawn to scale and are not to be interpreted as being precisely to scale.

DETAILED DESCRIPTION OF THE INVENTION AND PREFERRED EMBODIMENTS

Figure 1:
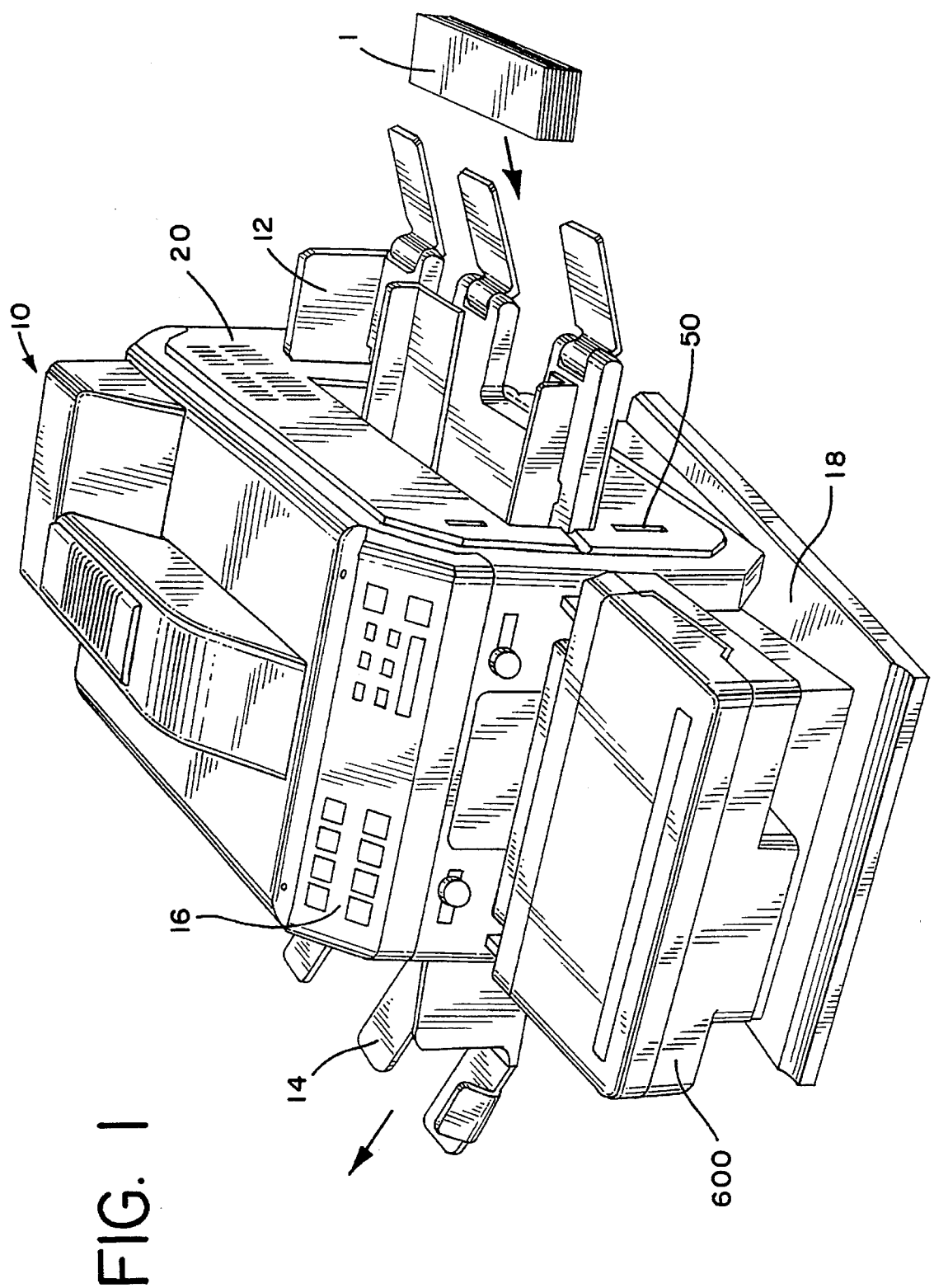
FIG. 1 is a front perspective view of the document processing machine of the present invention showing the outside of the unit with a stack of documents ready to be loaded onto the feed tray and the removable camera module in place so that the documents can be micro-filmed.

FIGS. 1–14 generally show the machine of the document processing system of the present invention that uses a straight-line or a straight through document path. Although many of the below described functions can be performed without regard to the particular order of all the functions, the preferred system will be described first with optional systems being described later. According to FIG. 1, the document processing machine 10 comprises a top portion 20 and a bottom portion 30 preferably attached to a base 18. A control panel 16 is provided on the front of the top portion 20 of the machine to monitor and control various functions of the machine. Preferably, the machine 10 slopes downward from the rear of the machine to the front to provide easy access to the control panel 16 and the inside of the machine.

The machine 10 has a removable sheet support platform or feed tray 12 that defines an inlet to the machine. The feed tray 12 supports a stack of documents 1 that are automatically and serially fed into the machine 10 for processing. The documents 1 are moved through the machine by a transport system 100 in a straight line document path from the inlet to the outlet onto a removable stacking tray 14 that defines an outlet from the machine. Preferably, an individual document 1 is removed from the bottom of the stack of documents, transported through the machine 10, and stacked on the stacking tray 14 in the same relative order. By providing a straight through document path, the likelihood of document jamming and loss is reduced while the manufacture and operation is simplified.

In accordance with one function of the machine 10, a removable camera module 600 is provided on the front of the machine 10 to microfilm the documents as they are transported through the machine 10.

Figure 2:
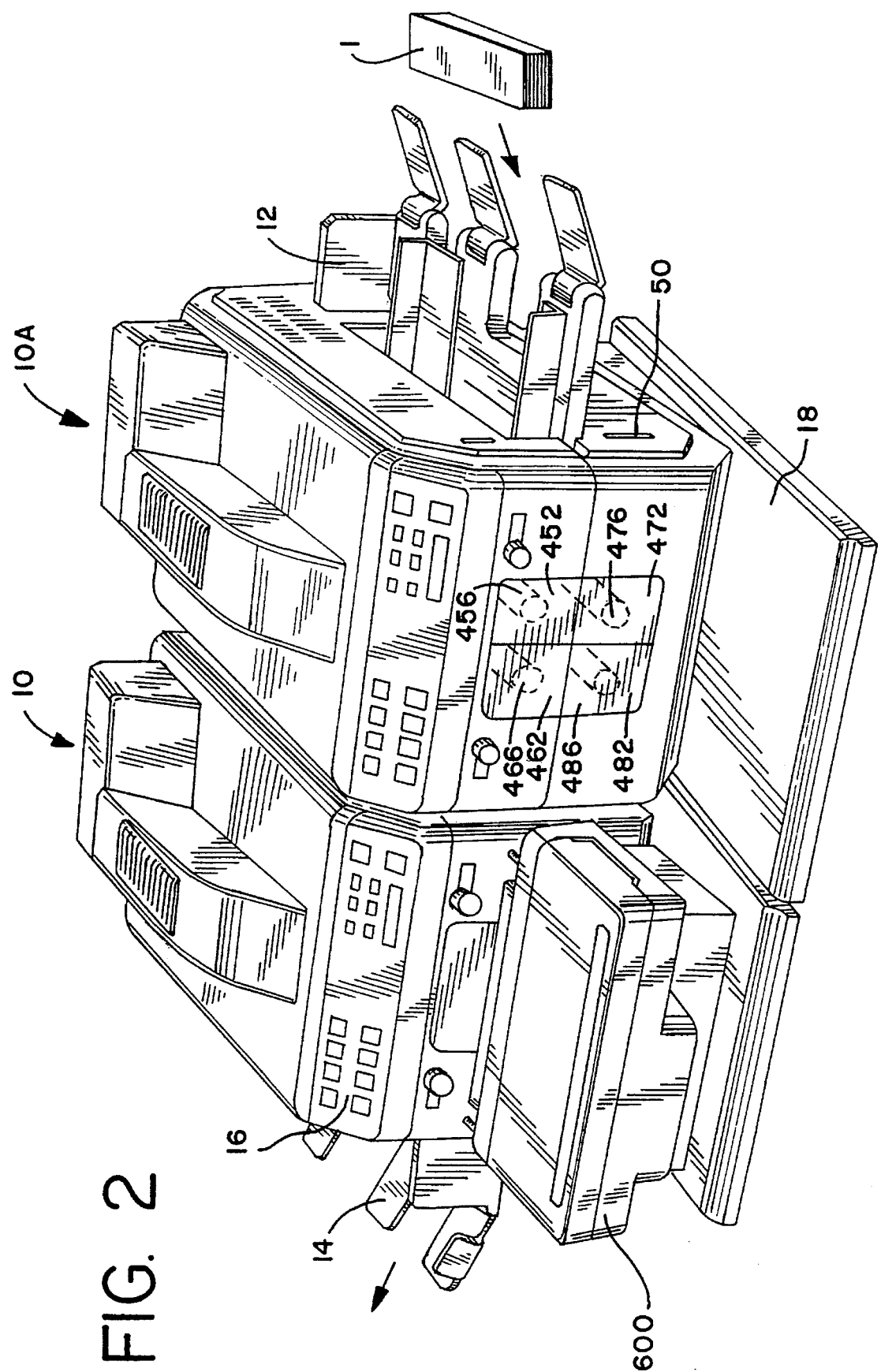
FIG. 2 is a front perspective view of two document processing machines of the present invention in a side-by-side relation to accomplish multiple document processing tasks in a single document pass with a stack of documents ready to be loaded onto the feed tray. The machine on the right-hand side of the figure has the removable camera module removed and can be used to endorse or imprint the documents or to electro-optically scan either one or both sides of the document. The machine on the left-hand side of the figure has the removable camera module in place so that the documents can be micro-filmed.

FIG. 2 shows the inlet of the machine 10 of FIG. 1 coupled to the outlet of another like machine 10a. In this case, the machine 10a has a removable feed tray 12 that defines the inlet to the series of machines 10 and 10a. The documents 1 enter machine 10a, are transported in a straight through document path to the outlet of machine 10a, where they enter the inlet to machine 10, are transported in a straight line document path to the outlet of machine 10, and are stacked on stacking tray 14. The machine 10a is shown with the camera module 600 removed and can be used to perform different and separate functions from the machine 10 such as electro-optical scanning of the document. Although two machines 10, 10a are shown coupled together, sometimes it may be necessary or desirable to provide more than two machines coupled together to accomplish the desired processing functions. As a result, the present invention contemplates any practical number of like machines 10, 10a, with each having a straight through document path for the processing of documents.

Where the machine 10a is used to electro-optically scan the document, the speed at which the document travels through the machine is substantially less than the speed at which the document can travel when being microfilmed. As a result, an automatic pulse feeder 80 may be used to feed the documents from the feed tray 12 into the machine 10a.

A. Housing

Figure 3:
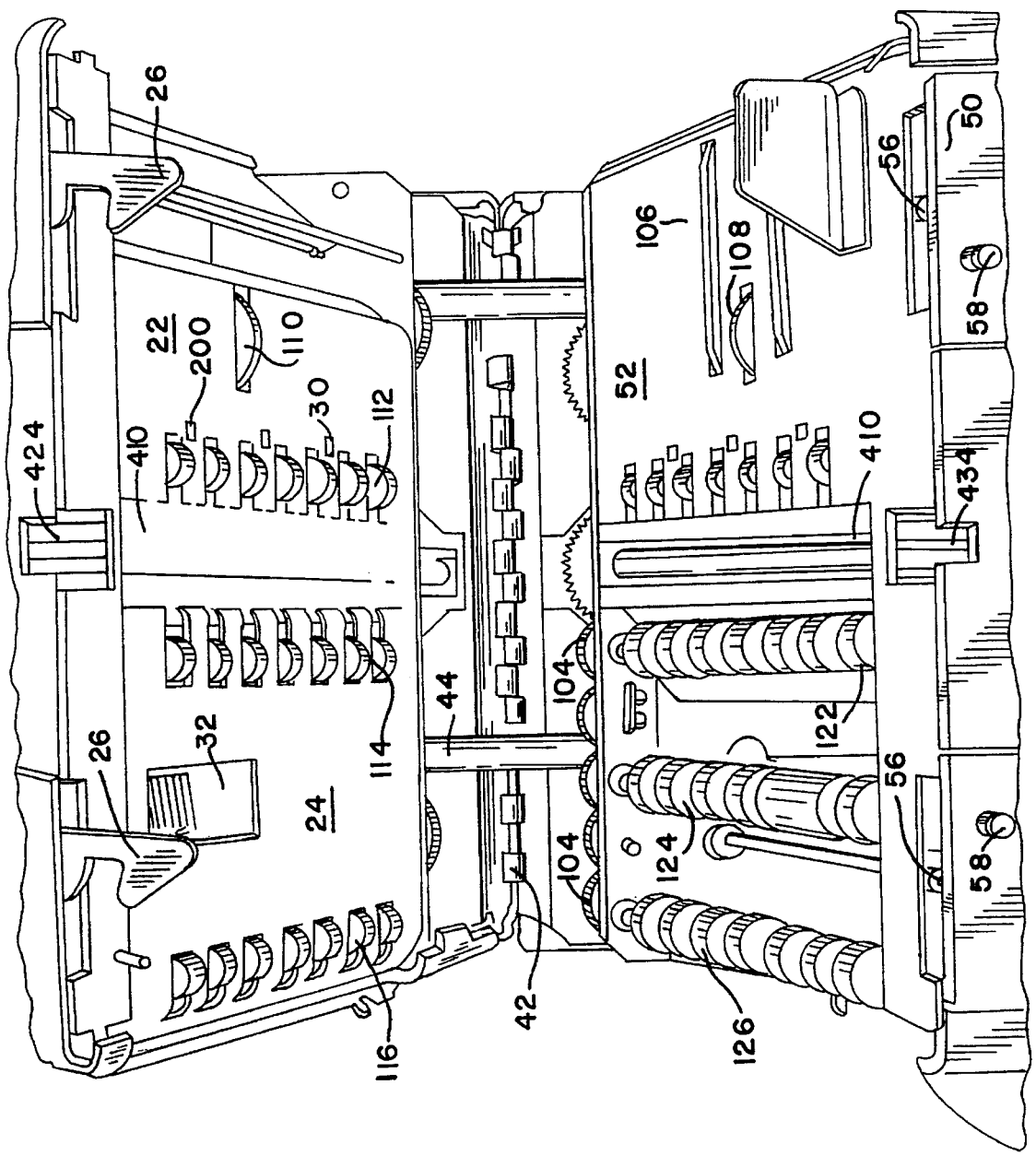
FIG. 3 is a front perspective view of either machine of FIG. 2 with the top portion of the machine separated from the bottom portion to define an open position and shows the inside of the unit, including the transport system, the sensing system, the optical system, and the endorser system.

With reference to FIG. 3, the machine of the present invention provides a housing having a top portion 20 and a bottom portion 50, with the bottom portion preferably secured to a base 18. The rear of the top portion 20 is pivotally secured to the rear of the bottom portion 50 so that the front of the top portion can pivot open with respect to the bottom portion in a clam-shell structure. Consequently, the machine 10 can be opened so that the transport system 100 and any documents located within the transport system can be easily seen and grasped by the user. Preferably, the rear of the top portion 20 is pivotally secured to the rear of the bottom portion 50 by hinges 42. The hinge can be of any suitable design capable of maintaining the top portion 20 pivotally secured to the bottom portion 50.

Preferably, at least one piston 44 connects the rear of the top portion 20 with the rear of the bottom portion 50 to regulate the speed at which the top housing 20 can be lifted from the bottom housing 50. The piston 44 also ensures that the top portion will be aligned with the bottom portion when the machine is in a closed position so that the driving gears will properly mesh, as will be more fully described below. More preferably, two pistons are provided.

The front of the top portion 20 is also desirably provided with at least one latch 26, preferably two, to positively engage a respective latch post 58 provided on the front of the bottom portion 50. The latches ensure that the machine remains in a closed position when closed. At least one guide pin 28 may also be provided near the front of the top portion 20 to engage respective guide pin apertures provided on the bottom portion and to further ensure that the top portion is properly aligned with the bottom portion when the machine 10 is closed. The guide pin 28 may also activate a switch so that the machine does not operate when the machine is opened.

Conveniently, the top portion 20 and the bottom portion 50 can be considered to have a right and a left side to divide each portion into substantially equal segments. Generally, each side is defined by a plate so that four plates are provided: a top right and left plate and a bottom right and left plate. Preferably, the plates are manufactured from steel or other smooth material to allow the documents to move easily through the machine. The plates may have any practical width from the front to the rear of the machine 10 and any length from the inlet toward the outlet. Since, according to the present invention, it is desired to provide a compact document processing machine, generally the width of the plates from the front to the rear of the machine 10 is such that the machine can accommodate documents having a length of approximately twelve inches.

The top portion has a first or right plate 22 located near the inlet of the machine and a second or left plate 24 located near the outlet of the machine. The plates 22 and 24 generally define right and left halves, respectively, of the top portion 20. Where the documents are to be filmed, for example, the right plate 22 may be separated from the left plate 24 by a glass flat 410 as will be more fully described below. The plates 22 and 24 may also have slots or apertures to receive one or more pieces of equipment useful in the processing of documents. For example, slots may be provided to receive rollers, sensing equipment, and equipment for endorsing, scanning, and imprinting.

The lower portion 50 also has a first or right plate 52 located near the inlet of the machine and a second or left plate 54 located near the outlet of the machine. The plates 52 and 54 generally define right and left halves, respectively, of the top portion 50. Where the documents are to be filmed, for example, the right plate 52 may be separated from the left plate 54 by a glass flat 410 as will be more fully described below. The plates 52 and 54 may also have slots or apertures to receive one or more pieces of equipment useful in the processing of documents. For example, slots may be provided to receive rollers, sensing equipment, and equipment for endorsing, scanning, and imprinting.

As noted above, the upper portion 20 is hinged to the lower portion 50 so that the upper right plate 22 is above and opposite the lower right plate 52 and the upper left plate 52 is above and opposite the lower left plate 54. When the machine 10 is closed, the upper plates 22 and 24 are spaced from the lower plates 52 and 54, respectively, to contain and provide a straight line document path for the documents.

B. Transport System

To transport the documents from the inlet feed tray 12 through the machine 10 to the outlet stacking tray 14 a document transport system 100 is provided. The document transport system generally has rollers, belts, or a combination of the two, that extend through the slots provided in at least one of the plates 22, 24, 52, and 54 for serially transporting the documents along a straight line document path from the inlet to the outlet of the machine 10. The rollers and belts are preferably constructed of a material such as rubber to provide a suitable frictional surface for transporting the documents. The transport system also includes a motor 101 to drive the rollers or belts through a main gear 102 and associated gears 104.

FIG. 3 shows a preferred embodiment of the transport system 100. In accordance with this preferred embodiment, at least one roller belt 106 is located in slots provided in the lower plate 52 to grip a document from the bottom of the stack of documents on the feed tray 12. Where the documents to be processed are bank checks, it may be desirable to use more than one belt and to locate the belts 106 near the front of the lower portion 50. The belt 106 withdraws a document one at a time from the bottom of the stack of documents and transports it into the machine.

A pickup roller 108 is located within the first bottom plate 52 to cooperate with a reverse bias roller 110 located within the first top plate 22 to reject any more than one document sheet. Preferably, the pickup roller 108 is spring biased upward to provide tension against the reverse bias roller 110 to ensure that the documents are fed serially.

A first upper transport roller 112 is provided after the reverse bias roller 110 within the upper first plate 22 to further guide the document through the machine. The roller 112 preferably cooperates with a first lower transport roller 120 located within the lower first plate 52 to positively engage the document so that it is transported through the machine in a substantially straight line path. Preferably, the rollers 112 and 120 are slotted.

In accordance with this preferred embodiment, second upper roller 114 and third upper roller 116 are provided within the upper second plate 24. Roller 116 is located near the outlet of the machine with roller 114 located closer to the inlet. In addition, second lower roller 122, third lower roller 124, and fourth lower roller 126 are provided within second lower plate 54. Rollers 122 and 126 cooperate with upper rollers 114 and 116 to transport the documents out of the machine. As with rollers 112 and 120, upper rollers 114 and 116 and lower rollers 122 and 126 are slotted.

It is to be understood that a suitable number of upper rollers and lowers may be provided to transport the documents from the inlet of the machine to the outlet. For example, another upper roller may be provided in the upper second plate 24 to cooperate with the third lower roller 124. Of course, any number of variations may be provided to accommodate the document processing systems contemplated by this invention.

Figure 4:
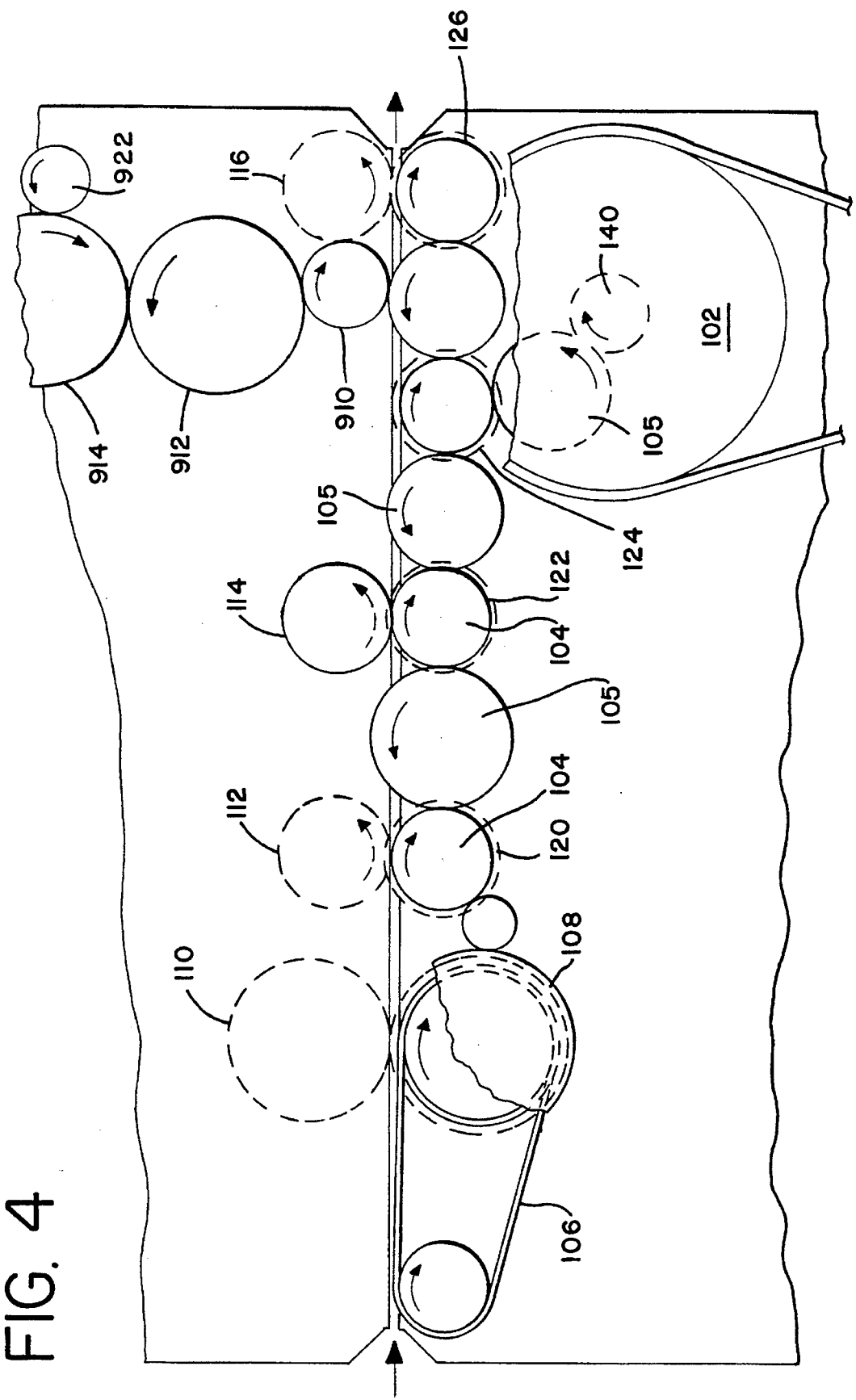
FIG. 4 is a rear view of a portion of one embodiment of the gear drive mechanism used in the transport system of the machine of FIG. 1.

To drive the above described belts and rollers, a motor 101 (shown in FIG. 13) is provided to drive the main gear 102 and, in turn, the associated gears 104 that drive the shafts carrying the rollers, and idle gears 105. FIG. 4 shows a rear view of the transport system 100 where it will be seen that main gear 102 is driven by a belt connected to a motor with each of the rollers 120, 122, 124, and 126 driven in turn by their associated gears 104 through idle gears 105. The upper rollers 112, 114, and 116 are driven in turn by the opposite lower rollers 120, 122, and 126 respectively. In this way, the document is transported in a straight line path from the inlet to the outlet of the machine.

Figure 7:
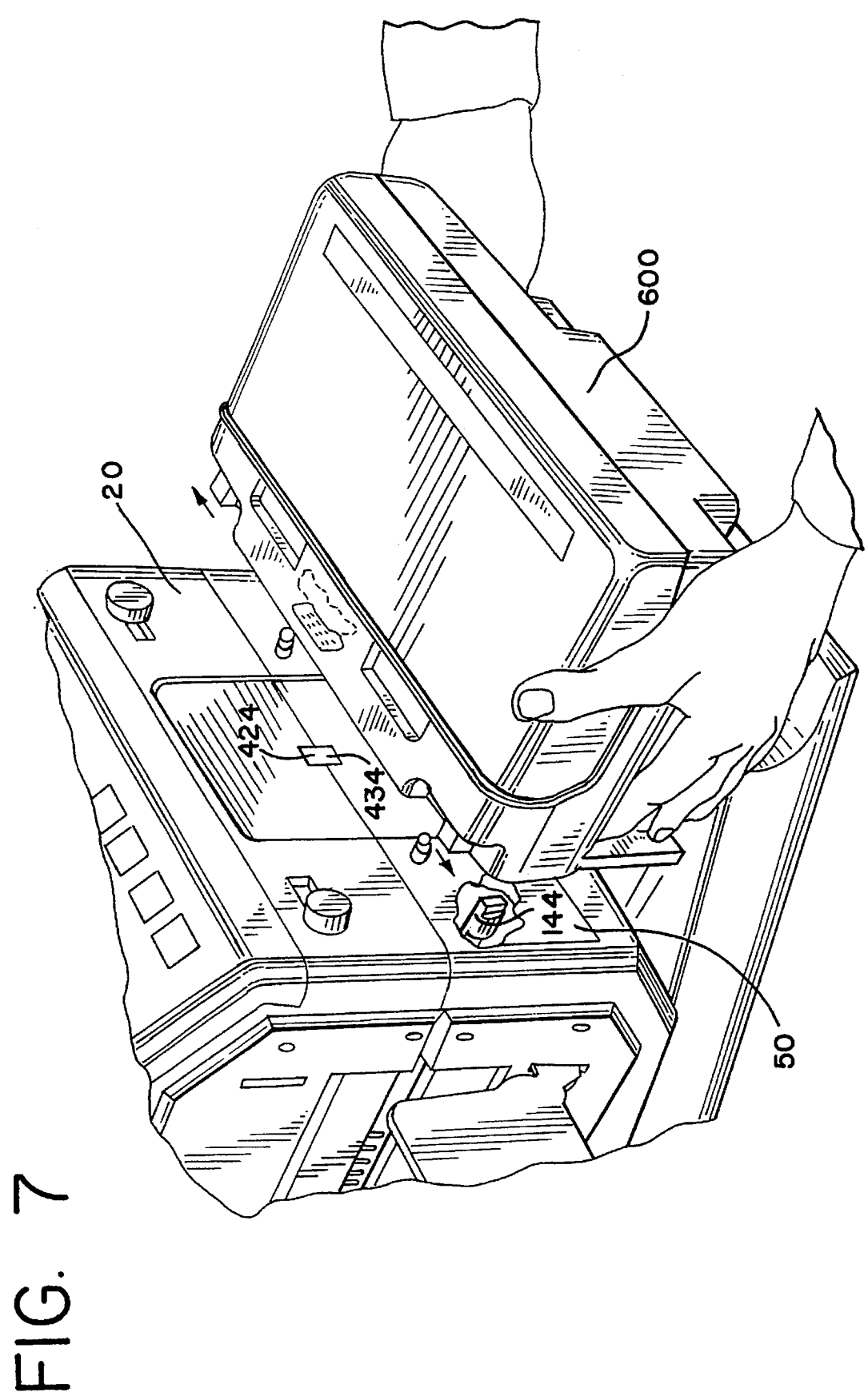
FIG. 7 is a front perspective view of the machine of FIG. 1 with the rotary camera module being removed.
Figure 13:
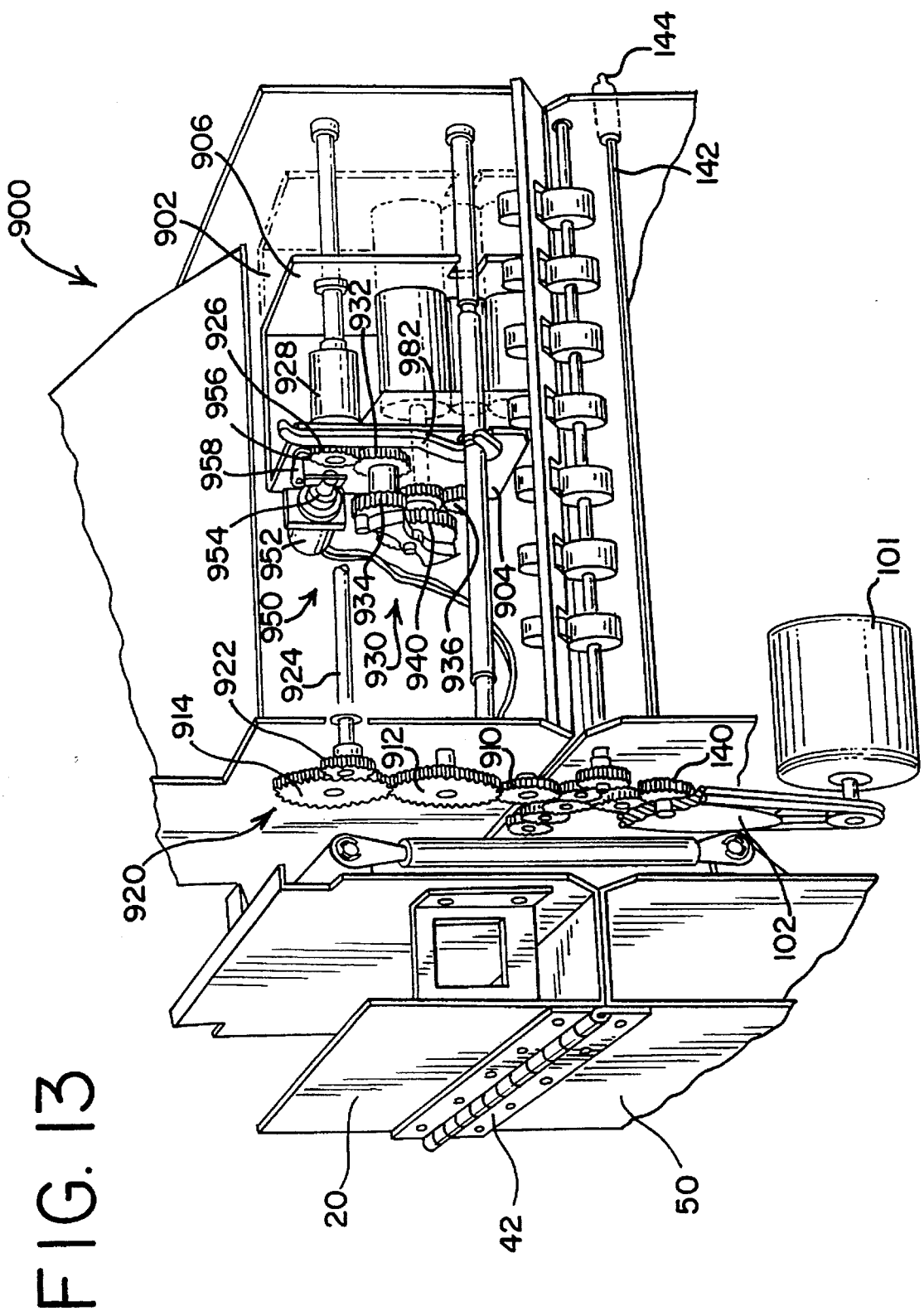
FIG. 13 is a rear side cut-away view of the machine of FIG. 1 that shows a portion of the document transport system and a portion of the endorser drive system.

In addition, FIGS. 4, 7, and 13 show that the main gear drive 102 also drives the camera main gear drive 140 and in turn, shaft 142 and coupling 144. Coupling 144 engages gear drives in the removable camera module 600 to drive the film.

Uniquely, the gears 104 carrying the shafts for the rollers 120, 122, 124, and 126 together with their associated idle gears are located at the rear of the lower portion 50 of the machine and the gears for the camera drive mechanism and endorser system 900 are located at the rear of the upper portion 20 of the machine. Because of this arrangement of gears, together with the hinges 42 and pistons 44, when the upper portion 20 is pivoted to a closed position, the gears for the camera drive and endorser system will properly mesh with the gears for the lower rollers to provide a machine having a straight line document path.

The substantially straight line document path structure, in which a document moves from side-to-side instead of in a serpentine fashion, is advantageous because it greatly reduces the problems associated with paper jams and lost documents due to turnover mechanisms. As a result, the invention provides increased reliability as well as a reduction in the number of parts required to manufacture the machine. Moreover, because the machine has a clam-shell structure, the housing can be easily open to provide complete access to the transport system and any documents located in the transport system.

C. Sensing System

It is sometimes desirable to sense the presence of the document as it passes a particular location in the machine so that desired processing functions can be coordinated as the document passes through a particular document processing system. In addition, when documents such as bank checks are being processed, it is desirable to count the number of documents being processed by the machine. Accordingly, the machine 10 may include upper sensor slots 30 within the upper first plate 22 to receive a sensor or sensing system 200. Alternatively, or in addition to the upper sensor slots 30, lower sensor slots 60 may be provided in the lower first plate 52 to receive the sensing system 200.

The sensor system 200 can include photo-detectors that detect the presence of each transported document 1 as the leading edge of the document interrupts the light reaching the detector. The electrical output from the detectors can be used as an input into a counter as well as an input into other document processing systems, for example, the camera module 600 or the endorser system 900, through, for example, the electronic logical controller 1100. The electronic logical controller 1100 can be provided those skilled in the relevant art to achieve the desired operation.

In the preferred operation shown in FIG. 3, a document is fed along a straight line document path by belts 106, rollers 108 and 110, past the sensor system 200, through rollers 112 and 120 to an upper and lower glass flat 410 of the optical system 400 to film an image of the document, and through rollers 114, 122, and 116, 126 to the stacking tray 14 at the exit of the machine.

D. Optical System

It is often desirable to film both sides of documents. For example, financial institutions such as banks desire to microfilm both sides of checks to show all endorsements. Accordingly, they find it convenient to have the image of the front and the back of the check adjacent each other for ease of retrieval and viewing. In order to accomplish this, the image of both sides of the document must be reflected by mirrors through a lens onto the film adjacent each other. Furthermore, it is desirable to record at high document velocities since the volume of documents to process is often high.

Reference is made to an optical system for a rotary type camera U.S. Pat. No. 4,190,353. In a rotary type camera, the documents to be photographed are caused to enter a transport system, either manually or automatically, and are moved at essentially constant velocity through the photographic area and into a stacking hopper. Sensors are provided to start the film moving and to open the camera shutter as a document passes the sensor. As each document passes through the aperture, or photographic area, the image of the document is reflected by a series of mirrors through the camera lens and onto the film which is moving at a speed proportional to the speed of the document. Since the movement of the film and the document is proportioned, the image of the document is stationary, or essentially so, on the surface of the recording medium even though the image and the film are both in motion.

It is also desirable to use as few mirrors as possible, while conserving the size of the machine since each mirror can require time consuming and costly alignment and adjustment. One skilled in the art can appreciate that a slight misalignment of any one mirror can move the document image out of alignment with the camera lens. The greater the number of mirrors, the greater is the possibility of misalignment and the more difficult it becomes to properly realign the system. This results in increased manufacturing costs and service calls at the operating location. Also, the intensity of the document image is reduced somewhat each time it is reflected. This causes a need to use brighter, less economical lamps for document illumination, and increases the possibility of causing extraneous light to falsely expose the film.

The present invention contemplates providing, an optical system 400 that includes at least one mirror housing for holding a pair of mirrors in an aligned position, and an associated light source. Preferably, the mirror housing including the mirrors and glass flat is sealed. The optical system 400 cooperates with a removable camera module that optically records the images of documents, in greatly reduced size, upon film while those documents are continuously and serially being transported in a straight line path past the optical system 400. Two optical systems, located opposite each other may be provided to allow both sides of the original document to be recorded simultaneously.

A document transport controller advances the document 1 at a specified rate past the glass flat 410. At the same time, a film transport controller advances the film at a rate proportional to the rate the document is travelling. For example, if a 44:1 reduction ratio of document size to film image size is desired, the film is advanced at 1/44th of the document transport rate by the film transport controller. As the document passes through the optical system 400, an image of the top of the document is projected through the camera lens onto a portion of the film and an image of the bottom of the document is simultaneously projected through the camera lens onto a different portion of the To begin microfilming a document, it is pulled past the glass flat. The glass flat 401 provides an imaging region that allows both sides of a document to be photographed at once, or alternatively only one side to be photographed if so desired as in the case of documents having information contained on only one side of the document. When the document is being photographed, images of both sides of the document are reflected through a series of mirrors to a lens of a microfilm camera to expose the image on a microfilm that is disposed in an exposure region at the focal plane of the lens.

The lens preferably has an optical axis generally orthogonal to the direction of travel of the documents being fed and lying in a plane generally parallel to the document itself. This construction lends itself to compactness and to a minimum of reflecting surfaces.

With particular reference to FIGS. 5 through 11, a preferred embodiment of the optical system is shown. In this preferred embodiment, both sides of the document can be filmed. The optical system 400 includes an upper optical system located in the top portion 20 capable of providing an image of one side of the document 1 and a lower optical system located in the bottom portion 50 capable of providing an image of the other side of the document. Each optical system includes a mirror housing 402, a first removable light source, and a removable camera module 600. The mirror housing 402 includes a first half to hold a pair of mirrors and a second half to provide an enclosed mirror housing. When the two halves are joined, the mirrors are enclosed and the glass flat 410 is supported in position. As best seen in FIG. 3, when the mirror housing is in place within the top portion 20, the glass flat 410 is coextensive with the upper first and second plates 22 and 240 When the mirror housing is in place within the lower portion 50, the glass flat 410 is coextensive with the lower first and second plates 52 and 54. Since the upper mirror housing and lower mirror housing are identical, the number of parts required to assemble the mirror housing is reduced.

Figure 10:
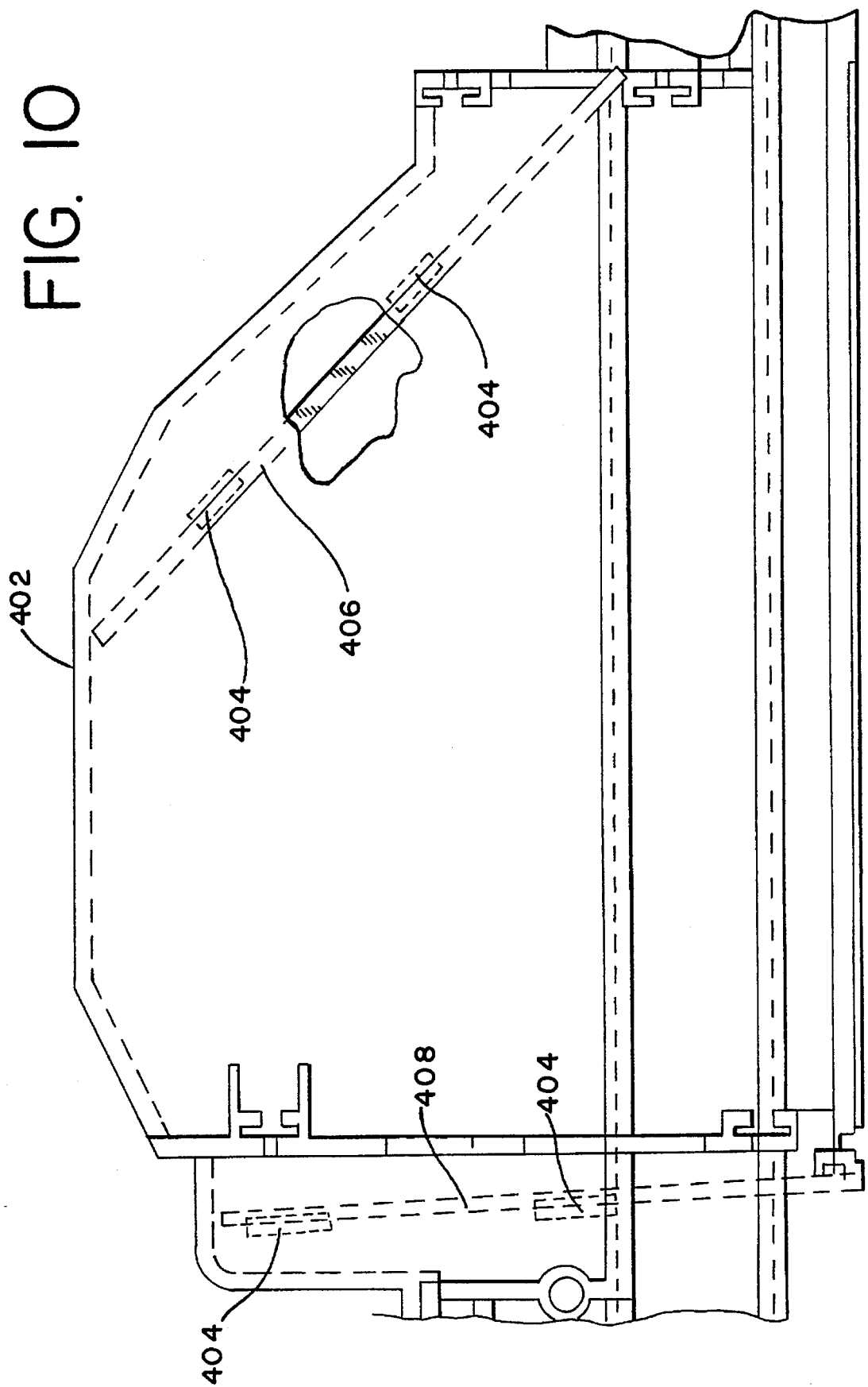
FIG. 10 is top plan a view of one-half of a mirror housing with the mirrors in place.

As best seen in FIG. 10, the first half of the mirror housing 402 has mirror holders 404 to hold the first mirror 406 and the second mirror 408 in their respective desired locations. The holders 404 also simplify the alignment of the mirrors so that the housing can be easily assembled. Advantageously, only a single pair of mirrors 406 and 408 are required for each of the upper and the lower mirror housings 402 so that assembly of the mirror housings 402 within the machine is simplified. Of course, where it is desired to film only one side of the document, it is only necessary to provide one mirror housing.

Figure 5:
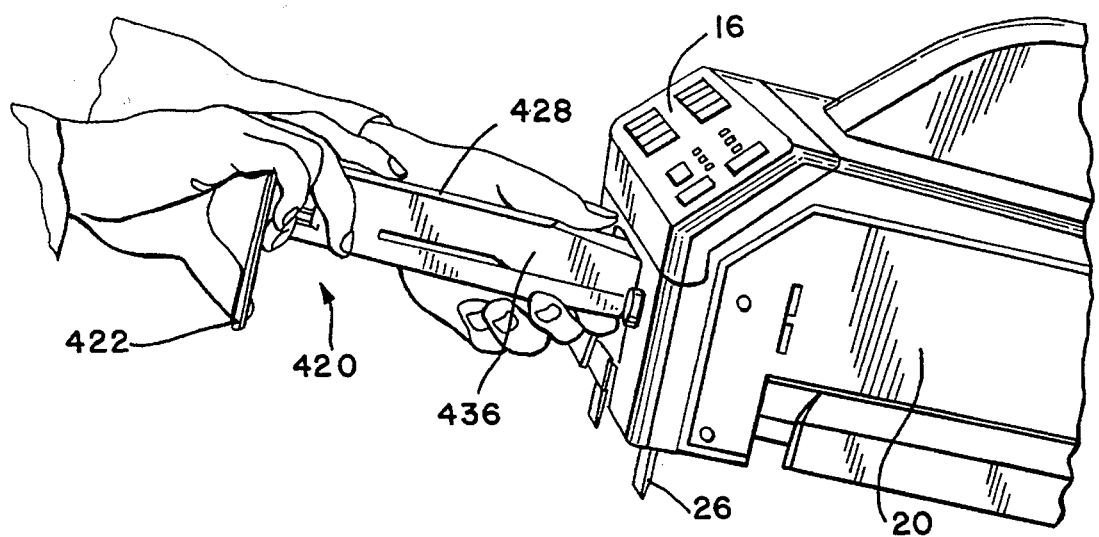
FIG. 5 is a side perspective view of the top portion of the machine of FIG. 1 that shows the partial insertion of one embodiment of a top enclosed light source.

To illuminate the document, at least one removable light source is provided and includes a lamp and a reflector to direct light onto one side of the document to the respective mirrors and to the camera module. In accordance with the preferred embodiment where both sides of the document are to be microfilmed, an upper light source and a lower light source is provided. FIG. 5 shows an upper light source housing 420 being partially removed from the upper portion 20 of the machine 10. The upper light source housing 420 includes a plate 422 that is flush with the front of the upper portion 20 when the light source housing 420 is fully inserted into the upper portion. The plate 422 has at its bottom center a notch or cut-out 424 (best seen in FIG. 3) through which light from the reflecting mirrors 406 and 408 can travel. The plate 422 also carries a lamp 426 and a reflector 428 for reflecting the light from the lamp toward the glass flat 410 to 18]] one side of the document 1.

Figure 6:
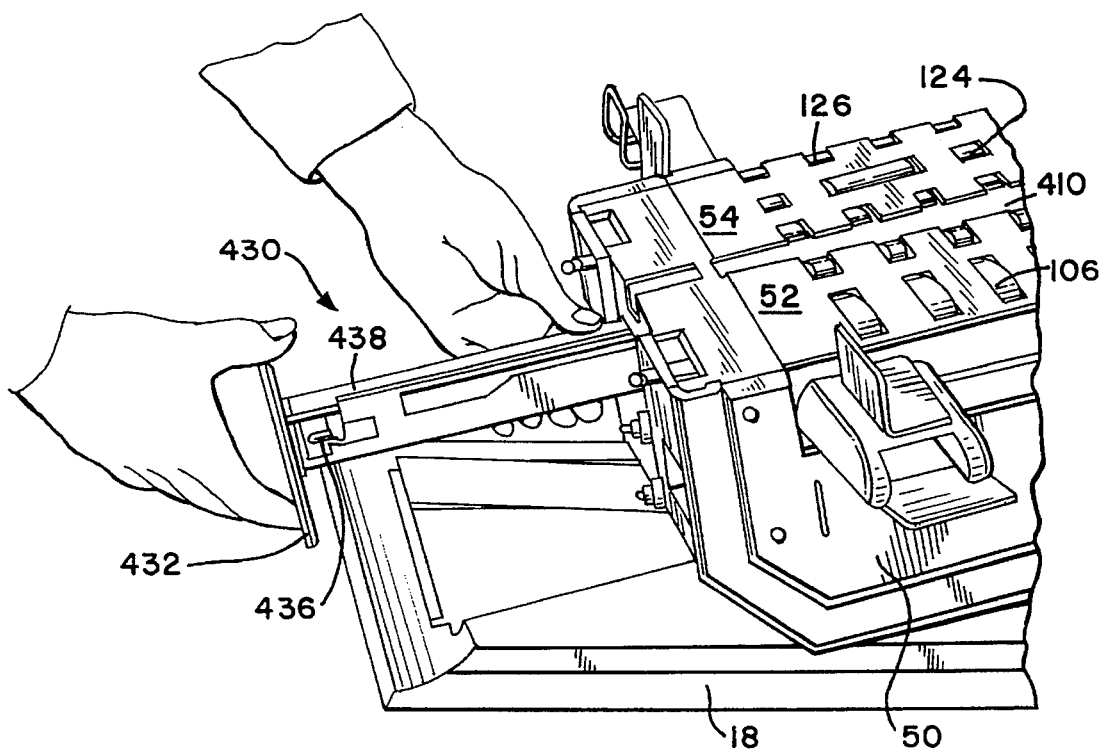
FIG. 6 is a side perspective view of the bottom portion of the machine of FIG. 1 that shows the partial insertion of one embodiment of a bottom enclosed light source.

FIG. 6 shows a lower light source housing 430 being partially removed from the lower portion 50 of the machine 10. The lower light source housing 430 includes a plate 432 that is flush with the front of the lower portion 50 when the light source housing 430 is fully inserted into the lower portion. The plate 432 has at its top center a notch or cut-out 434 (best seen in FIG. 3) through which light from the reflecting mirrors 406 and 408 can travel. The plate 432 also carries a lamp 436 and a reflector 438 for reflecting the light from the lamp toward the glass flat 410 to illuminate the other side of the document 1. When the top and bottom light source housings are in their respective positions, a rectangular aperture is defined through which the image of both sides of the document can pass through to the camera module 600.

Although for microfilming purposes it is usually sufficient to use only a single lamp to provide light for one side of the document 1, sometimes it may be desirable to use two lamps to provide greater illumination. In addition, when the document is to be electro-optically scanned, it is generally desirable to provide greater illumination of the document than is required for micro filming. When it is desired to provide greater illumination for both the top and the bottom of the document, four light sources can be provided. The machine 10a in FIG. 2 is shown with four light sources.

With reference to FIG. 2, an upper right light source 450 can be removably inserted into the front of the upper portion 20 of the machine. The light source 450 includes a housing plate 452 that can have a notch or cut-out (not shown) in one corner, preferably the lower left-hand corner. The plate 452 carries a reflector (not shown) and a lamp 456 in the same manner as described above for the upper light housing 420. An upper left light source 460 can be removably inserted into the front of the upper portion 20 adjacent the light source 450. The light source 460 has a plate 462 with one side that abuts a side of plate 452. The plate 462 carries a reflector (not shown) and a lamp 456. The plate 462 may also have a notch or cut-out (not shown) in one corner, preferably adjacent the cut-out in plate 452 so that when the plates 452 and 462 are inserted into the upper portion, an aperture is defined through which the image of one side of the document can pass.

A lower right light source 470 can be removably inserted into the front of the lower portion 50 of the machine 10. The light source 470 includes a housing plate 472 that may have a notch or cut-out (not shown) in one corner, preferably the upper left-hand corner adjacent the cut-out in plate 452. The plate 472 carries a reflector (not shown) and a lamp 476. A lower left light source 480 can be removably inserted into the front of the lower portion 30 adjacent the light source 470. The light source 480 has a plate 482 with one side that abuts a side of plate 462 and 472. The plate 482 carries a reflector (not shown) and a lamp 486. The plate 482 may also have a notch or cut-out (not shown) in one corner, preferably adjacent the cut-out in plate 472 and so that when the plates 472 and 482 are inserted into the lower portion 50, an aperture is defined through which the image of the other side of the document can pass.

As noted above, an aperture is defined by the light source housings through which an image of the document can pass. In one embodiment, where the documents are to be microfilmed, a removable camera module 600 is provided that cooperates with the aperture so that the image of the document is transferred onto the film. In particular, the module 600 carries a lens 608 through which the image of the document passes.

Figure 11:
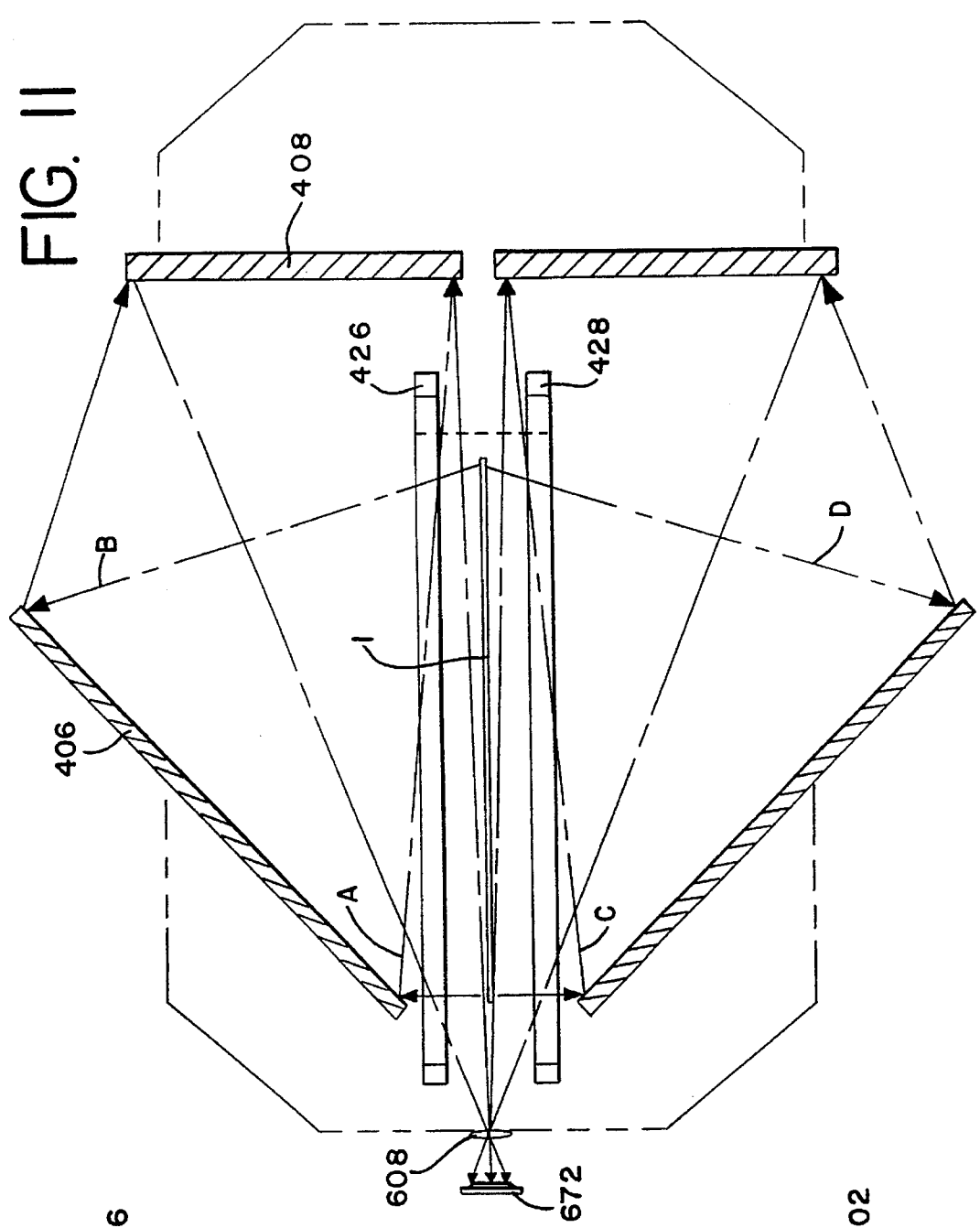
FIG. 11 is a side view of the optical system useful in the machine of the present invention that shows the document image light path.
Figure 12:
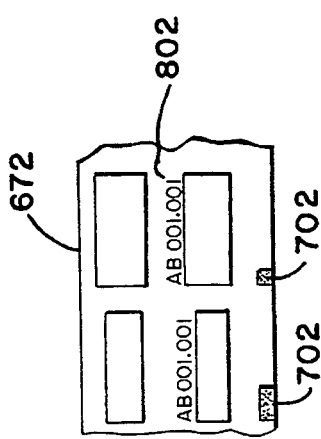
FIG. 12 shows the document image format on a portion of microfilm used to record the documents transported through the machine of the present invention.

FIG. 11 shows a side view of the optical system 400, the lens 608, and a portion of film 672 with a schematic of the document image light path. In particular, as the document 1 passes the glass flat 410 a portion of the image of one side of the document is directed along optical path A to upper front mirror 406 to upper rear mirror 408, through the aperture defined by the upper light source housing 420, to the lens 608 and onto a portion of the film 672. At the same time, another portion of the image of the document from the same side is directed along optical path B onto a portion of the film 672. Simultaneously, the image of the other side of the document is directed through the lens and onto a different portion of the film 672. Specifically, a portion of the image of the other side of the document is directed along optical path C to lower front mirror 406 to lower rear mirror 408, through the aperture defined by the lower light source housing 430 to the lens and onto a portion of the film 672. Another portion of the image of the document from the same side is directed along optical path D onto a portion of the film 672. FIG. 12 shows a portion of the document image format produced from the optical system 400 and camera module 600 of the present invention.

E. Camera Module

The camera module 600 according to the preferred embodiment, is removable from the front of the machine 10. When the camera module 600 engages the front of the machine 10, drive coupling 144 cooperates with a camera drive mechanism 680 to drive the capstan 630 and a wheel 612, driver 636 and a film reel as will be further described below. A tachometer 690 (best seen in FIG. 9) can be provided to cooperate with the supply reel to indicate jammed film, a low film supply, film footage and the like. A further and more detailed description of a tachometer may be found in U.S. Pat. No. 4,148,579 entitled "Automatic Microfilm Camera" and incorporated herein by reference.

Figure 8:
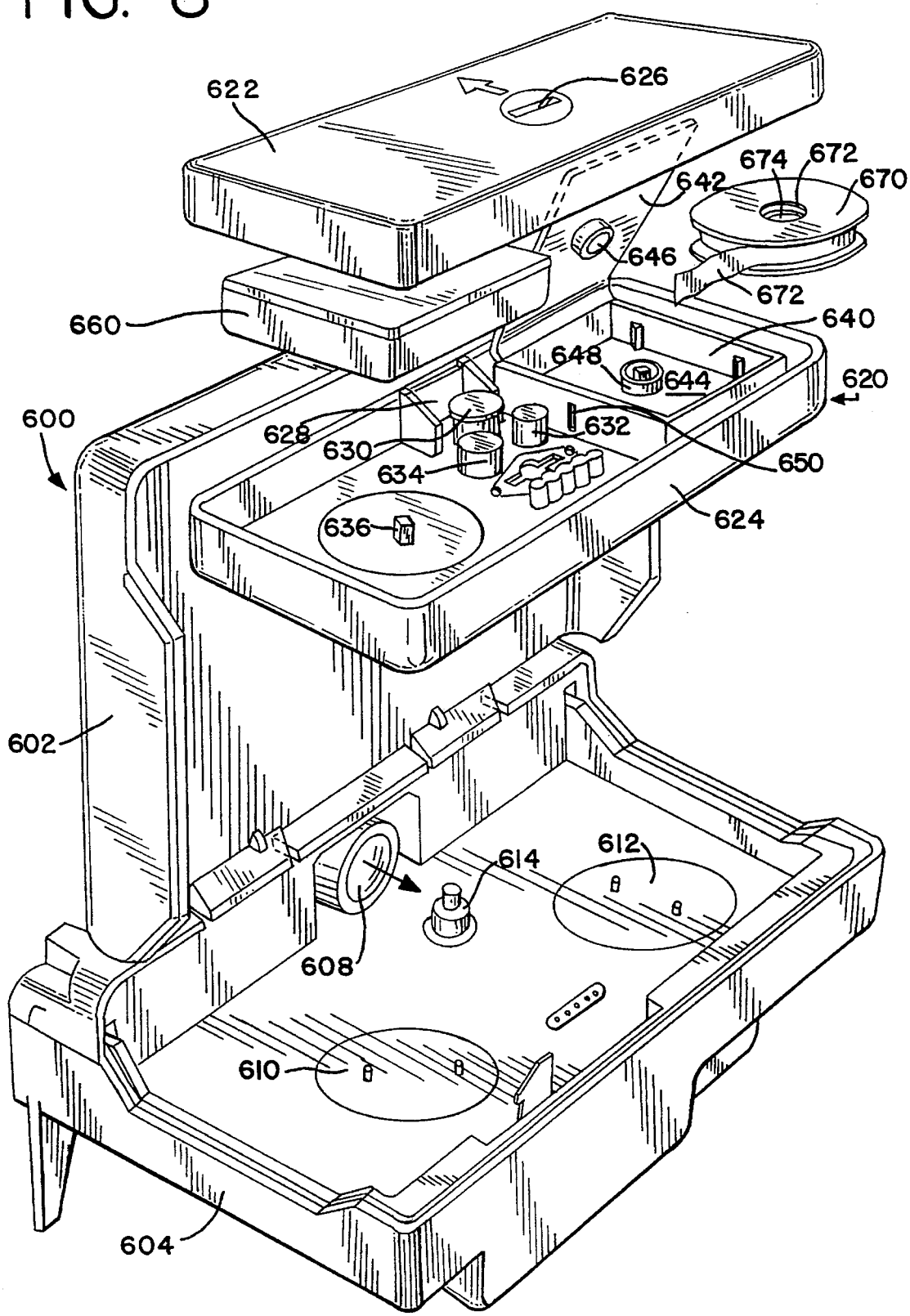
FIG. 8 is an exploded view of the preferred rotary camera module showing the lens, a film cassette, including a capstan and rollers for transporting the film through an exposure region, cartridges useful in the cassette, and a spool of film.

As best seen in FIG. 8, the camera module 600 includes a top 602 hinged to a bottom 604 that defines a cassette compartment 606. Within the cassette compartment, a lens 608 is provided such that when the camera module 600 is engaged to the front of the machine 10, the lens is aligned with the aperture defined by the cut-outs 424 and 434 to receive the images from the document through the optical system 400.

The camera module has a cassette compartment 606 receives a cassette 620 that holds film cartridges 640. The compartment 606 has a drive wheel 612, a driven wheel 610, and a capstan drive coupling 614. The drive wheel 612 is driven by a take-up drive gear 688 (FIG. 9) as will be more fully explained. Each wheel cooperates with drivers 636 provided within the cassette 620 to move the film from the supply reel to the take-up reel. The capstan drive coupling 614 is driven by a capstan gear or drive 686 and cooperates with the capstan 630 provided in the cassette 620 to move the film from the supply cartridge to the take-up cartridge.

It is common practice when microfilming documents to use an automatic rotary-type microfilm camera where the documents are fed automatically and filmed as they pass through the machine. It is a conventional practice primarily for convenience that light-tight film cartridges are used. either pre-loaded cartridges or standard unexposed film reels as received from the manufacturer are loaded into the unused film cassette in subdued light. The film is properly threaded through appropriate rollers to a take-up cartridge or reel. The cassette is then closed with a light-tight cover. The cassette may then be carried into a light area and loaded into and removed from a machine at any time without any danger of exposing the film in the cassette. In fact, it is common practice to film a number of documents that would constitute a job or a run that would cause only a limited amount of the film in the cassette to be exposed. The cassette could then conveniently be removed from the camera until more documents associated with that job could be accumulated for filming. In the meantime, another cassette could be inserted in the microfilm camera to perform entirely different filming operations.

Reference made to U.S. Pat. No. 4,153,361 which is incorporated herein by reference and discloses a cassette with removable film cartridges. In general, a cartridge is a shell, housing or other device containing a web, such as film. The cartridge may be a supply cartridge, in which case it contains a fresh web supply (such as unexposed film, for example). The cartridge may also be a take-up cartridge, in which case it contains a web which has been drawn from the supply and at least partially processed such as exposed, but undeveloped film, for example). A cassette is a device having both a supply and a take-up cartridge mounted thereon. When the supply is exhausted, the take-up cartridge is removed from the cassette, and the former supply cartridge can be moved to the take-up position on the cassette and a new supply cartridge is mounted on the cassette and cartridge used in the machine of the present invention are easily loaded and unloaded into the machine. In addition, the cassette and cartridge are light-tight so that unexposed or undeveloped film is not inadvertently exposed.

Referring now to FIG. 8 which shows the preferred rotary camera module 600, the cassette 620 comprises a top 622 and a bottom 624 with the top having a lock 626 to secure the top to the bottom. Preferably, the cassette 620 is molded from plastic and is sized to fit within the cassette compartment 606. As viewed in FIG. 8, the left-hand side of the cassette 620 carries a supply cartridge 660 and the right-hand side carries a take-up cartridge 640. The cartridges 640 and 660 are identical and are preferably molded from plastic. Referring to cartridge 640, it includes a top 642 hinged to a bottom 644 so that when the cartridge is closed it provides a light tight environment for the film contained within the cartridge. To ensure that the cartridges provide a light fight compartment, a downward extending annulus 646 is molded onto the inside surface of the top and an upward extending annulus 648 is molded onto the inside surface of the bottom. Mating annular recesses 676 are molded into the reel 670. As a result, there is no direct path for light to either pass or be reflected. The annuluses 646 and 648 and the mating recesses 676 formed on the reels 670 also form hub areas for supporting the reel 670.

The cassette also includes a trigger mechanism that controls the advance of the film in the cassette.

When the upper portion 20 is unlatched from the lower portion 50, i.e., when the machine 10 is open, the film is not allowed to advance. The film 672, in the imaging region 628, however, may become exposed by the fight passing through the optical system and lens. Consequently, provision is made to allow that exposed film to be advanced beyond the imaging region after the machine is closed.

A hole is formed on one side of each cartridge, preferably opposite the top 642, to align with cartridge driver 636 so that the driver couples with the hub 674 to drive the film reel 670. As supplied by the manufacturer, the film 672 is wound on a supply reel 670 in supply cartridge 660 (identical to cartridge 640) and the end of the film projects outwardly through a slot 650. The slot 650 is sealed by a suitable light sealing material. The end of the film 672 pulled over guide roller 634, around the capstan 630, so that it passes through an imaging region 628, pulled over guide roller 632, fed through slot in take-up cartridge 640, and into a capture slot in the hub of the take-up reel. A similar capture slot is also formed in the hub 674 of the supply reel. Because the cartridges are preferably molded of plastic in the shape of a box with an integrally molded cover that can snap into place with the three edges of the box, threading of the film into the take-up cartridge is simplified. The cover may then be opened when the film is led over the guide roller, around the capstan, over the guide roller and connected to the take-up reel.

Figure 9:
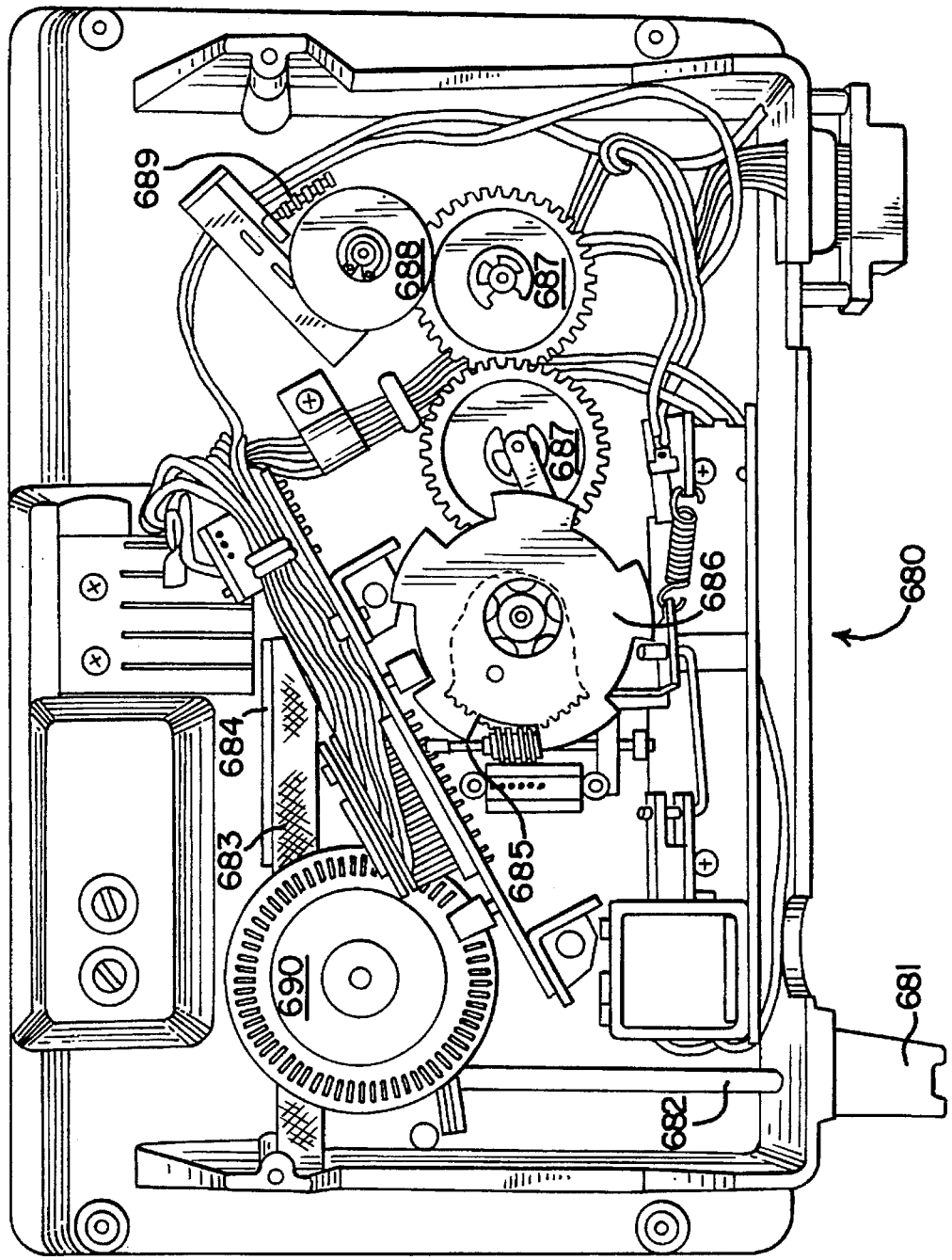
FIG. 9 is a view of the camera drive mechanism from the bottom of the camera module showing the tachometer, the capstan drive, the take-up drive, and associated parts.

As noted above, the coupling 144 cooperates with the camera drive mechanism to drive both the capstan 630 and the drive wheel 612 so that the film is advanced from the supply cartridge 660 to the take-up cartridge. FIG. 9 shows the underside of the camera module 600 that contains the camera drive system 680. The drive system 680 includes a coupling 681 that positively mates with the coupling 144 to drive the drive system. Coupling 681 is joined with a shaft 682 upon which a belt 683 drives pulley 684. The pulley 684 through an associated shaft drives the capstan drive 686 which is connected to the capstan to move the film from the supply reel to the take-up reel. The take-up drive gear 688 is also driven through a series of transfer gears 687 to, in turn, drive the take-up wheel 612, its associated driver, and take-up reel 670. Preferably, the take-up drive gear 688 is driven at a speed greater than the capstan drive 686 to ensure that the film remains taut. To prevent breakage of the film, a clutch 689 is used. The capstan is preferably manufactured from a non-slippery material such as rubber to grip the film and move it from the supply cartridge to the takeup cartridge.

A particular advantage to using the described cartridges 640 and 660 is that when the take-up roll is full, the cartridge can be removed from the cassette 620 to be developed without unintentionally exposing the film to unwanted light. Although it is preferred to use the cartridges 640, 660 of the present invention, many industries use an open reel configuration similar to reel 670 shown in FIG. 8. As a result, there may be occasions when it is necessary or desirable to use these reels without the cartridges 640, 660. In this case the reel may be loaded directly onto the driver 636.

A shutter (not shown) is provided for the lens 608 and operates responsive to the sensing system 200 expose the film and make a photographic image on the portion of the film in the exposure area. Since the documents travel at a high rate of speed past the sensing system 200 and thus the optical system and the distance between successive documents if generally less than the width of the individual document, the shutter is generally opened when the first document is sensed and remains open until a sufficient time elapses (a time proportional to more than the width of several documents) at which time when the sensing system does not detect the presence of any more documents, the shutter closes.

G. Image Marking System

When micro filming documents, it is desirable to provide a means for simplifying the retrieval of the images recorded on the film when using a microfilm reader. Accordingly, the machine 10 of the present invention provides an image marking system 700 suitable for providing blips 702 on the film 672 (best seen in FIG. 12). Blipping refers to recording a mark adjacent to each image frame on the microfilm in order to facilitate automatic searching for a preselected frame. For example, a separate light source such as a light emitting diode is positioned so that its light will shine on a portion of the film to provide a blip mark on the microfilm adjacent to the image area of the document. During the readout, the blip marks are counted to enable an automatic machine to film one specific frame during searching. If for example an image is the tenth image on a roll of microfilm, a counter may be set to ten. When the reader counts ten blip marks, it stops the film so that the image recorded at the time of blipping is projected in the format area of the microfilm reader. It is also desirable to provide at least three different sizes of blips. For example a large blip can be used to designate a block of documents, a medium blip can be used to designate a batch of documents, and a small blip can be used to designate an item.

A further and more detailed description of one method of providing blips may be found in U.S. Pat. No. 4,148,579 entitled "Automatic Microfilm Camera" and incorporated herein by reference. Of course, other methods for providing blips are contemplated.

H. Image Numbering System

It is also desirable when micro filming documents to relate the individual document image to such information as the date, the operator's name, the film roll number, and other such alphanumeric information. Accordingly, the machine 10 of the present invention includes an image numbering system 800 that can provide image numbers 802 on the film 672 adjacent the document image (best seen in FIG. 12). The term "image number" is meant to designate any alpha or numeric character image.

In one embodiment, a keyboard may be provided at the control panel so that the operator can key in a number that will, through circuitry, activate light emitting diode displays so that when the document is filmed, the identifying numbered is also filmed. Of course, the number displayed may be automatically advanced one digit response to every photographed image, or in any other suitable manner so that multiple entries may be made under a single file number. A further and more detailed description of this method of providing image numbers may be found in U.S. Pat. No. 4,148,579 entitled "Automatic Microfilm Camera" and incorporated herein by reference.

In another embodiment, the characters are written on the film one vertical line at a time using an LED (light emitting diode) display that generates one single vertical line of a character at a time. The illuminated characters generated by the LED array are directed to the camera by, for example, a series of mirrors. A single character is composed by generating a series of vertical lines one element wide, that when placed side by side, add up to create a single character. A further and more detailed description of this method of providing image numbers may be found in U.S. Pat. No. 4,984,008 entitled "Film Number Writing System" and incorporated herein by reference.

Once the first slice or single line of a character has been generated, it is photographed. Then a new vertical slice of a character is generated. The film and the document are advanced, and that portion of the character is photographed. Since the film is continually advancing through the camera at a predetermined rate, the single vertical lines are effectively placed side by side on the film. Once a sufficient number of lines are fried, a complete character is created. In this way, a string of characters is formed to create an identification code.

The LED array can be controlled by a character generation controller to sequentially generate character segments. For example, a 1×7 LED dot matrix array could be used so that each character segment is 1 element wide by 7 elements high. Through the use of mirrors, an image of the LED array is placed in an otherwise unusable area of the film, for example, the center of the dual side image area on the film, in the area where the glass flat blocks imaging rays or below the document image area.

Where a 1×7 LED dot matrix array is used, the character generation controller generates alpha or numeric characters from one to seven elements high and in any combination or sequence. Since he microfilming system photographs documents continuously, a slice at a time, the 1×7 LED dot matrix array can write an array of up to 7 dots high by an unspecified length. The LED array is selectively turned on as the film moves past the lens. Character generator turns on the LED generator for a specified period of time. The turn-on time is calculated based on the speed at which the document travels past the glass flat. After one vertical segment or slice of a character is photographed, the next vertical slice of a character is generated. This slice is placed on the film immediately adjacent to the previous slice. In this way, a single letter or a single numeral is written one vertical line at a time, each line being seven elements high. By stringing together a series of 1×7 matrices, single characters can be generated one after the next. This sequencing of characters creates a specific alpha/numeric code that can be used to identify the documents.

I. Endorsing System

Where the documents to be processed in the machine 10 of the present invention are bank checks and similar items, the machine includes an endorsing system 900 suitable for stamping an incremental endorsement. Where a single machine 10 is used, the upper left plate 24 includes an endorser slot 32 for receiving the print cylinder of the endorser system. In the preferred embodiment shown in FIG. 3, the endorsing system is located after the optical system and before the outlet and most preferably located in the top portion 20 of the housing. Although an endorsing module that endorses in a single location may be used, most preferably the endorsing module will allow endorsement in a number of locations on a document, with each document receiving only a single endorsement as it passes through the endorsing system. This multi-position feature permits various parties handling a document to each endorse the document in a separate discrete location. A further and more detailed description of a multi-position incremental document endorser may be found in U.S. Pat. No. 5,182,991 entitled "Multi-Position Incremental Document Endorser" and incorporated herein by reference.

Generally, the endorsing system includes a housing 902, transfer gears, an endorser drive 920, an incremental drive mechanism 930, a trigger mechanism 950, and a removable print unit 970. The transfer gears 910, 912, and 914 transfer power from the main gear drive 102 to an endorser drive 920. The endorser drive 920 includes the input gear 922, which is driven by transfer gear 914, drives the endorser drive shaft 924.

Mounted on the drive shaft 924, inward of the input gear 922 and adjacent the one side of wall 904 of the housing, for free rotation about the drive shaft, is a pinion gear 926. The pinion is integral with a sleeve that permits physical translation of the pinion gear along the length of the longitudinal axis of the shaft 924. The sleeve may be fitted to a bearing.

Adjacent the bearing, along the drive shaft and adjacent the other side of wall 904 of the housing is a translatable clutch unit 928. The pinion gear is secured within the split housing of the clutch. The clutch is freely translatable along the length of the longitudinal axis of the drive shaft. Movement of the housing 902 along the length of the drive shaft results in corresponding movement of the clutch, pinion and bearing along the drive shaft.

Rotation of the pinion gear 926 provides the drive for the incremental drive mechanism 930. The incremental drive mechanism 930 includes a series of gears 932, 934, and 936 and a Geneva drive mechanism 940. The output of the drive mechanism 930 is the incremental drive of the endorser or print unit 970.

Figure 14:
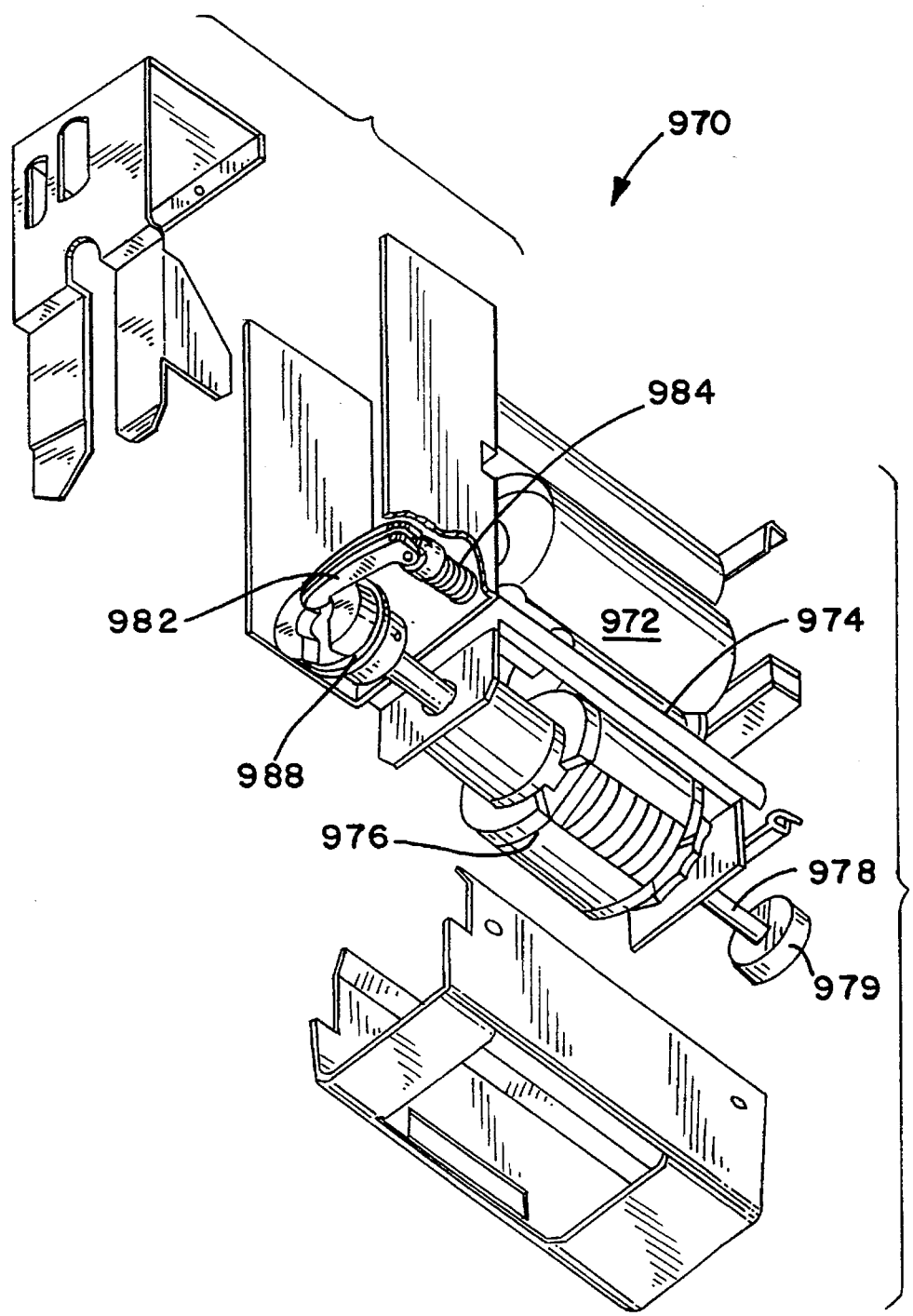
FIG. 14 is an exploded view of the endorser print unit that shows the ink cylinder and the print cylinder and associated parts.

As best seen in FIG. 14, the print unit 970 includes an ink supply well 972, an ink transfer cylinder 974, and a print cylinder 976 for printing the endorsement onto the document as it travels through the machine 10. The incremental drive 930 drives the print unit 970. A locking latch 982 being biased by spring 984 cooperates with the notched wheel 988 to maintain the orientation of the print cylinder.

A trigger mechanism shown generally at 950, is mounted to the side plate 904, as part of the housing 902. The trigger mechanism includes a solenoid assembly 952 having a plunger 954, a bracket 956, a lever 958, a top 960, and a spring 962. Upon activation of the solenoid assembly by an electronic signal, the plunger 954 is retracted moving the lever 958 which allow movement of the Geneva mechanism.

The print unit 970 can be removed from the housing 902 by lifting upward in a vertical direction. By removing the print unit 970, the date bands can be changes as desired. In particular, mounted within the print cylinder drive shaft, is the date adjusting shaft 978. The date adjusting shaft 978 can be retracted from the print cylinder so that by manipulating the knob 979, an individual date band can be changed.

At the rear of the print unit 970, a latch mechanism that can pivot with housing plates 904 and 906 can be provided to secure the housing in a first and a second endorsement position. Alternatively, a latch mechanism 982 can be provided adjacent the housing 902 so that when the latch is unlocked, the housing 902 can moved from a first endorsement position to a second endorsement position. For example, if the housing is located at a first endorsement position, the latch is urged toward the front of the housing by the user and the housing is moved to the second endorsement position, so that when the latch is released, the housing is secured in the second endorsement position.

In operation, the endorser housing 902 is placed into a first position for receipt of documents for endorsement. Documents are fed by the transport system 100 to the endorsing system 900. When the moving document is properly positioned for endorsement, the solenoid is actuated to permit movement of the print cylinder 976 to endorse the document. The location of the position of the document and actuation of the electronic solenoid is undertaken by an electronic control, preferably in cooperation with the sensor system 200.

In the first endorsement position, checks are fed to the endorsing system where the print unit places a single endorsement in the set location on each check as it moves through the endorser system. In order to endorse documents in a second position or different location side-to-side, on the reverse side of the check, the endorser housing, which includes the endorser drive, the incremental drive mechanism, the trigger mechanism, and the print unit as an integral unit, is moved to a second endorsement position along the drive shaft. In the second position, the endorser is operated to print endorsements on the moving documents in the same manner as described above. Each document is imprinted with a single endorsement. Accordingly, the endorsements may be made at separate and discrete locations along the check. Endorsement in a third position is achieved by reversing (side-to-side) the orientation of the checks.

Figure 15:
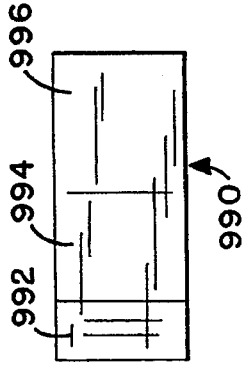
FIG. 15 is an illustration of a bank check that shows the three portions or areas for endorsement.

FIG. 15 illustrates the reverse side of a standard bank check 990 and the three positions for endorsements. In accordance with government regulations, the payee's endorsement is permitted only in the left-hand portion 992 of the reverse side of the check. The endorsement of the bank of first deposit is permitted only in the center portion 994 of the check. Any subsequent bank's endorsement is permitted only in the fight hand portion 996 of the check. The right-hand portion of the check is accessed by reversing the positioning of the checks in side-to-side relation.

The endorser system 900 of the present invention allows each bank to place its endorsement in the specified location. Depending upon whether the bank is the payee, the bank of first deposit, or the bank of subsequent deposit, the endorser module can be positioned to provide the endorsements on a number of checks in the particular required location. The endorser housing 902 can be moved along the shaft to the desired location and then driven in that location to provide endorsements on multiple checks. Of course, the checks must be fed in the proper orientation.

J. Electro-Optical Scanning System

While microfilming of documents provides many advantageous archival capabilities, there are drawbacks to its use. One particular drawback is that it is sometimes difficult to quickly retrieve the image of a document and any other information corresponding to that document. As a result, optical scanners are used to provide an output signal representative of the image of the original document. The output signal can then be stored in a computer readable form so that a computer can be used to quickly search for a particular document. One disadvantage to optical scanners is that their magnetic storage media has not been determined to be suitable for long term archival purposes. Accordingly, there is a need for a machine that can combine the advantages of microfilm and the advantages of optical scanning. The machines of the present invention may include an electro-optical scanning system 300 to optically scan the documents in conjunction with microfilming as described above.

FIG. 2 shows a preferred embodiment of such a system where a first machine 10a includes an electro-optical scanning system 300. Because the scanning system 300 operates at a much lower speed than that normally encounter for microfilming, the scanning system 300 operation will generally precede the other operations, particularly microfilming. As a result, the output of machine 10a is used as the inlet to machine 10. In addition, the light required to obtain a clear scanned image of the document is greater than that required for microfilming. As a result, it may be desirable to provide four lamps 456, 466, 476, and 486 as described above. The scanning lens, however, is located in the lower portion 50 of the machine so that the cut-outs 454, 464, 474, and 484, described above, are not needed. In this case, the plate 452, 462, 472, and 482 will be solid and without the cut-outs.

In particular, an automatic pulse feeder 80 is used to selectively feed a single document in a periodic interval. As the document moves through the electro-optical system 300, the image of the document is obtained and processed in the scanner electronics module 304 to provide, for example, a bit mapped image 306 or selective binary or digital output for use with external communications 308 equipment.

The electro-optical scanning system 300 generally comprises an electro-optical element with a processor for processing the document image signals to provide selectively binary or digital signal output.

K. Bar Code Scanning System

It is known that some documents contain bar coded information such as invoice numbers and freight bill numbers. The machine 10 of the present invention may include a bar code scanning system 500 having a scanner capable of reading such bar code symbologies. As a .result the manual entry of such information by the operator is eliminated. In addition, the machine can index such bar code information with the document's image whether captured by microfilm or by an electro-optical scanner.

L. Document Imprinting System

The machine 10 also may include a document imprinting system 1000 for printing characters onto the document as it passes through the machine. For example, the date and time can be printed by the document imprinting system 1000 on such documents used for remittance processing, accounts payable, and insurance claims processing applications. In one embodiment of the document imprinting system 1000, an ink jet printer 1010 is provided that is activated by an electronic control, preferably in cooperation with the sensor system 200.

M. Electronic Logical Controller

The machines 10 and 10a described above are controlled by a suitable electronic logical controller 1100. The term electronic logically controller is used in a broad manner to encompass not only the specific electronic devices, per se, but also all subsidiary or cooperating equipment that may be required to make a functional system, such as logic and control circuits, gates, signal channels, and the like.

In one preferred operation as shown in FIGS. 1 and 3, a document 1, from the bottom of a stack of documents placed on the feed tray 12, is fed along a straight line document path by belts 106, rollers 108 and 110, past the sensing system 200, to count the document and send electrical signals to the camera module 600 and the endorsing system 900 in cooperation with the electronic logical controller 1100. As the document 1 passes the sensing system 200, it is taken up by rollers 112 and 120 to the upper and lower glass flat 410 of the optical system 400.

As the document passes through the optical system 400, an image of the top of the document is projected by mirrors 406 and 408 in the enclosed upper mirror housing through the aperture formed by cut-outs 424, 434, to the camera module 600 where the image is received by the lens 608 and onto a portion of the film 672 in the imaging region 628. At the same time, an image of the bottom of the document is projected in the same fashion through, except through the enclosed lower mirror housing to the lens 608 and onto a different portion of the film so that the image of the top of the document is adjacent the image of the bottom of the document.

While the document 1 is passing through the optical system 400, a portion of the document is taken up by rollers 114 and 122 and transported to the endorsing system 900, where depending on the position of the housing 902, an endorsement is placed on the side of the document 1 facing up as the document travels on roller 124. As the document 1 travels on roller 124 and through the endorsing system, a portion of the document is taken up by rollers 116 and 126 to transport the document to the exit of the machine 1 and onto the stacking tray 14.

Each of the above described systems and functions can be controlled by the user through the control panel 16 and, in turn the electronic logical controller 1100. For example, if the user merely wishes to count the documents, the endorsing system 900 and the camera module 600 may be deactivated through the use of the control panel. Alternatively, if the user wishes to count and to film the documents, the user can deactivate the endorser and activate the counter and the camera module at the control panel 16. It will be understood by one skilled in the art that the systems and functions described above can be conveniently controlled by the user at the control panel 16 through the electronic logical controller 1100.

In another preferred embodiment, such as that shown in FIG. 2, a document 1 from the bottom of a stack of documents placed on the feed tray 12 is fed along a straight line document path by an automatic pulse feeder 80 to the electro-optical scanning system 300 where the top, the bottom, or both the top and bottom of the document can be scanned. Preferably, where both the top and the bottom of the document are to be scanned, a portion of the electro-optical scanning system 300 is located within the lower right plate 52 to scan the bottom of the document and a portion of the electro-optical scanning system 300 is located within the upper left 24 to scan the top of the document.

A transport system 100 can be located within the lower left portion 54 to move the document through and out of the machine 10 and to the inlet of the machine 10 where the document 1 can be taken up by a roller similar to roller 120 provided in the lower right plate 52 in place of the belts 106 and roller 108. Since the machine 10a uses an automatic pulse feeder 80 there is no need for the reverse bias roller 110 and it can be replaced by a driven roller similar to roller 112, if desired. The document can then be directed to the sensing system 200, the optical system 400, and the endorsing system 900, as described above, and then out of the machine 10 and onto the outlet stacking tray 14. It will be appreciated that the documents 1 travel in a straight line path through the machines 10a and 10.

While particular embodiments of a machine that can be used in the document processing system of the present invention have been described, modifications may be made by those skilled in the art that are within the spirit and scope of the present invention. Schematics of several embodiments of the document processing system of the present invention are shown in FIGS. 16 through 25. With reference to FIGS. 16–25, the figures generally refer to the machines 10 and 10a and include the straight line document path as described above with the documents 1 traveling from right to left.

Figure 16:
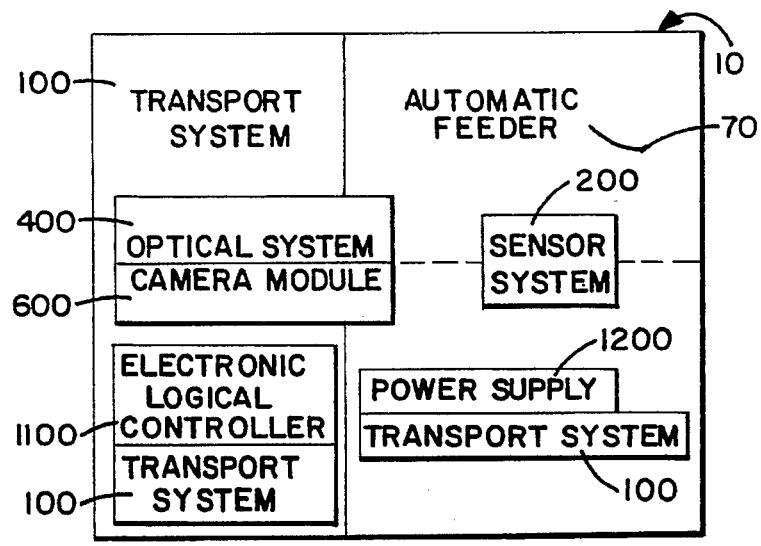
FIG. 16 is a schematic flow diagram showing one embodiment of a document processing system wherein the machine of FIG. 1 may be used.

With particular reference to FIG. 16, one embodiment of the document processing system includes an automatic feeder 80, a power supply 1200, a sensor system 200, a transport system 100 for serially transporting the documents in a straight line document path from right to left, an optical system 400 and a camera module 600 associated with the optical system. The document, therefore, is pulled into the machine 10 by automatic feeder 80 and a portion of the transport system 100 which moves the document in a straight line path to the sensor system 200 where the presence of the document is sensed and may be counted. The output of the sensor system 200 is used by the electronic logical controller 1100 to provide a control signal to the camera module 600. The document then moves to the optical system 400 where it is filmed using the camera module 600 and then transported by another portion of the transport system 100 to the exit of the machine 10.

In a preferred embodiment, the automatic feeder 80 is located in the upper right-hand portion of the machine 10 with the power supply 1200 and a portion of the transport system 100 located in the lower right-hand portion. The sensor system 200 is preferably located in both the upper and lower right-hand portion of the machine 10. The optical system 400 is located in the upper and lower portion of the machine, more preferably between the right-hand and left-hand portions of the upper and lower portions, and cooperates with the camera module 600 which is removable from the front of the machine 10. The balance of the transport system 100 is located in the upper and lower left-hand portion to move the document from the optical system 400 to the exit of the machine. The electronic logical controller 1100 may be provided within the lower left-hand portion.

Figure 17:
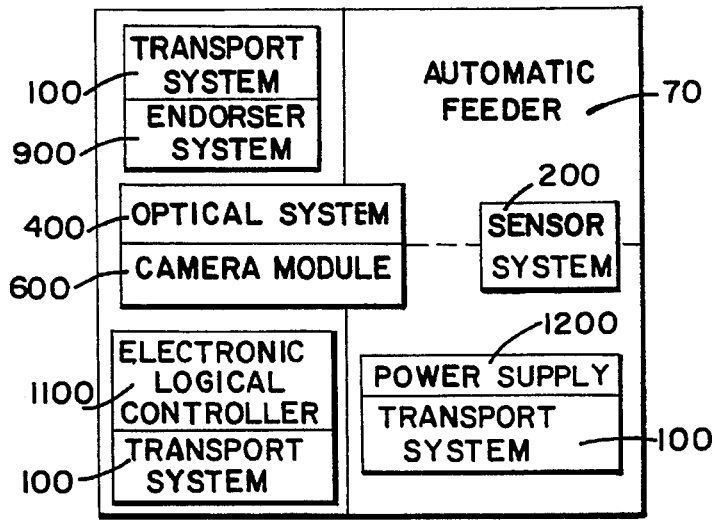
FIG. 17 is a schematic flow diagram showing another embodiment of a document processing system wherein the machine of FIG. 1 may be used.

FIG. 17 shows another embodiment of the document processing system where the system shown in FIG. 16 further has an endorsing system 900. In this embodiment, the endorsing system 900 is preferably located within the upper left-hand portion of the machine. This particular embodiment may be useful for processing bank checks and the like. The system comprises: automatically serially feeding 80 a single document from the bottom of a stack of documents and transporting them in a straight-line document path using a transport system 100; counting the document as it passes a sensor system 200; using a removable camera module 600 to optically film the document as it passes through an optical system 400; printing a single endorsement on the document as it passes through an endorsing system 900; and transporting the document to the exit of the machine.

Figure 18:
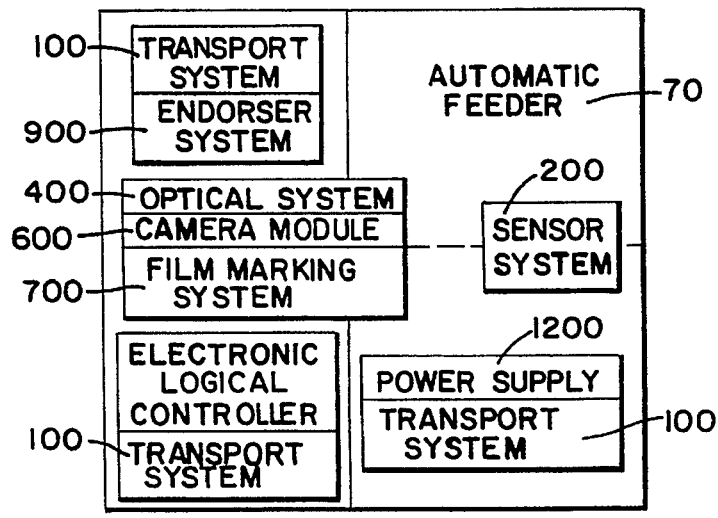
FIG. 18 is a schematic flow diagram showing another embodiment of a document processing system wherein the machine of FIG. 1 may be used.

FIG. 18 shows another embodiment of the document processing system where the embodiment in FIG. 17 further includes a film numbering system 800 to provide image numbers 802 on the film 672 adjacent the document image. This embodiment may also include a film marking system 700 suitable for providing blips 702 on the film 672. The film marking system 700 and film numbering system 800 cooperate with the camera module 600 and are preferably located after the sensor system 200. As a result, when the document passes the sensing system 200, an output signal is transmitted through the electronic logical controller 1100 to activate the film marking and number systems so that when the document passes the optical system 400 the image of the document transmitted to the camera module is coincident with the image numbers and blips provided by the film numbering and marking systems, respectively. In this way, the document image can be readily identified.

As noted above, the user can provide input to the electronic logical controller 1100 so that any combination of the feeder, transport, sensing, camera module, marking, numbering, and endorsing systems can be activated. As a result, it will be understood by one skilled in the art that other combinations not shown or described by FIGS. 16–18 may be provided within the scope of the present invention.

Turning now to FIG. 19, there is shown one embodiment of a document processing system that includes an automatic pulse feeder 80, an electro-optical scanning system 300 to scan a single side of the document, a transport system 100, and an electronic logical controller system 1100. The document, therefore, is pulled into the machine 10 by automatic feeder 80 and a portion of the transport system 100 which moves the document in a straight line path to the electro-optical scanning system 300 to scan a single side of the document and to send the imaged signal to a scanner electronics module 304 for processing into either bit mapped images 306 or to an external communications device 308. The document is then transported by another portion of the transport system 100 to the exit of the machine 10.

In a preferred embodiment, the automatic feeder 80 is located in the upper right-hand portion of the machine 10 with the power supply 1200 and a portion of the transport system 100 located in the lower right-hand portion. The electro-optical scanning system 300 is also preferably located in the lower right-hand portion and cooperates with the scanner electronics module which can located in the lower right-hand portion or at the rear of the lower portion. The balance of the transport system 100 is located in the upper and lower left-hand portion to move the document from the optical system 400 to the exit of the machine. The electronic logical controller 1100 may be provided within the lower left-hand portion.

FIG. 20 shows another embodiment of the document processing system where the electro-optical scanning system 900 can scan both sides of the document. In this embodiment, a portion of the electro-optical scanning system 300 is located in the lower right-hand portion, with the balance located in the upper left-hand portion. In this way, the document is pulled into the machine 10 by automatic feeder 80 and a portion of the transport system 100, which moves the document in a straight line path to a portion of the scanning system 300 to scan one side of the document, and then moves the document to the other portion of the scanning system to scan the other side of the document. The output of both portions of the scanning system is sent to the scanner electronics module 304 for processing into either bit mapped images 306 or to an external communications device 308. The document is then transported by another portion of the transport system 100 to the exit of the machine 10.

Figure 21:
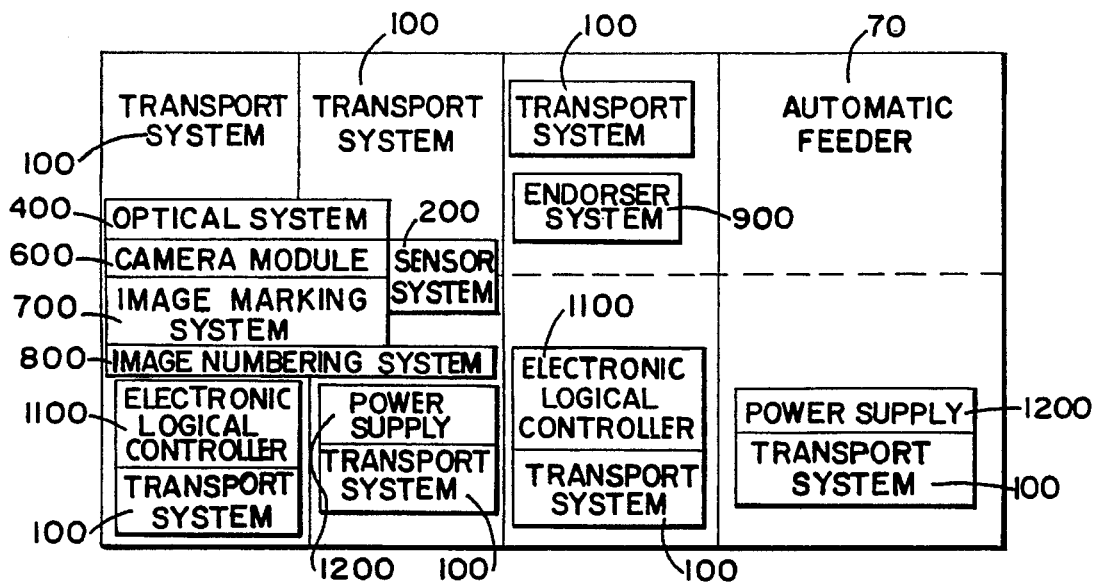
FIG. 21 is a schematic flow diagram showing one embodiment of a document processing system wherein the machine of the present invention configured as shown in FIG. 2 may be used.

While each of the embodiments shown and described by FIGS. 16–20 utilize a single machine it is sometimes desirable to provide additional document processing functions. As a result, the system of the present invention includes two machines linked such that the documents exiting the first machine are directed to the inlet of the second machine and the documents travel in a straight line path. FIG. 21 shows one embodiment of the system using two machines. The first machine 10a includes an automatic feed transport system 100, a sensing system 200, and an endorsing system 900. The second machine 10 includes a transport system 100, an optical system 400, a camera module 600, a film marking system 700, a film numbering system 800, and an electronic logical controller 1100.

Preferably, the machine 10a includes the automatic feeder 80 located in the upper right-hand portion of the machine 10a with the power supply 1200 and a portion of the transport system 100 located in the lower right-hand portion. The sensing system 200 is preferably located in both the upper and lower right-hand portion of the machine 10. The endorsing system 900 is preferably located within the upper left-hand portion of the machine 10a. A portion of the electronic logical controller 1100 may be provided within the lower left-hand portion of the machine 10a.

The machine 10 includes a portion of the transport system 100 located in both the upper and lower right-hand portion.

The optical system 400 is located in the upper and lower portion of the machine, more preferably between the right-hand and left-hand portions of the upper and lower portions, and cooperates with the camera module 600 which is removable from the front of the machine 10. The balance of the transport system 100 is located in the upper and lower left-hand portion to move the document from the optical system 400 to the exit of the machine. A portion of the electronic logical controller 1100 may be provided within the lower left-hand portion of machine 10.

The document, therefore, enters machine 10a and is transported in straight line document path by feeder 70 and a portion of the transport system 100 to the sensing system 200 where the presence of a document is sensed and may be counted, the output of the sensing system 200 is used by the electronic logical controller 1100 to control the endorsing system. After the document passes through the sensing system 200, the document is transported to the endorsing system 900 where a single endorsement is placed on the document and then transported from the machine 10a to enter machine 10 where the document is transported by transport system 100 to the optical system 400 that cooperates with the camera module 600 to microfilm the document. At the same time, the marking system 700 and the numbering system 800 are activated to place a blip and alphanumeric characters on the film adjacent the document image. The document is then transported from the machine 10.

Figure 22:
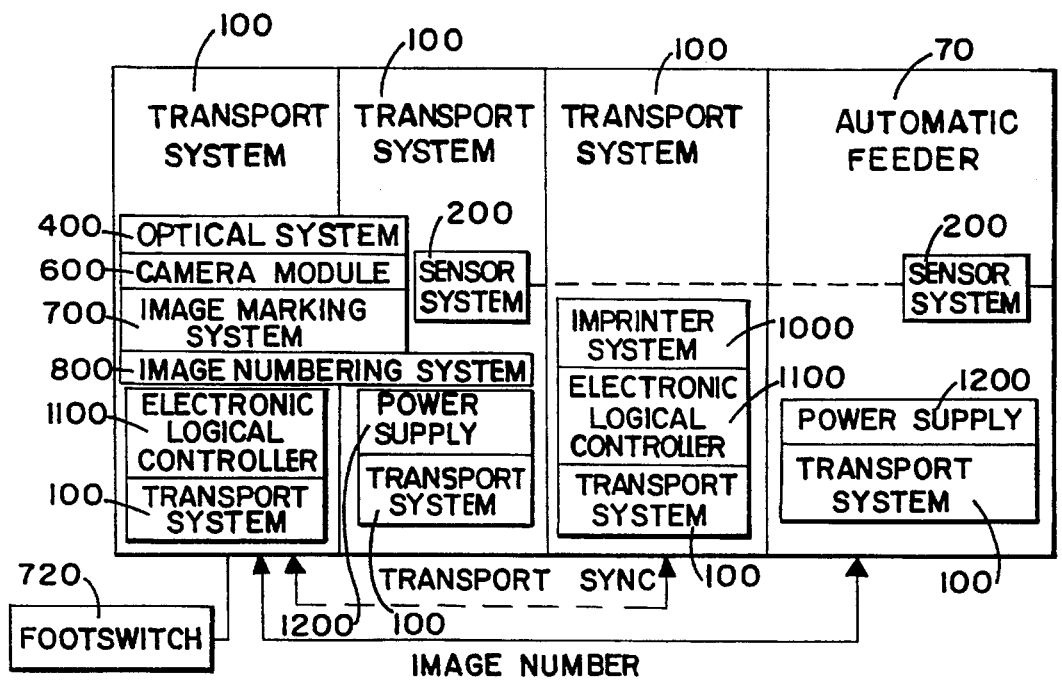
FIG. 22 is a schematic flow diagram showing another embodiment of a document processing system wherein the machine of the present invention configured as shown in FIG. 2 may be used.

FIG. 22 shows another embodiment of the system using two machines. The first machine 10a includes an automatic feeder 80, a transport system 900, an imprinting system 1000, and an electronic logical controller 1100. The second machine 10 includes a transport system 100, a sensing system 200, an optical system 400 that cooperates with a camera module 600, a marking system 700 and a numbering system 800. Preferably, the machine 10a includes the feeder 80 located in the upper right-hand portion with the transport system 100 located in the upper left-hand portion and the entire lower portion. The imprinting system 1000 is located in the lower left-hand portion with the electronic logical controller 1100. Preferably, the machine 10 includes the transport system 100 in both the upper and lower right-hand and left-hand portions of the machine. The sensing system 200 is preferably located in both the upper and lower right-hand portion of the machine 10. The optical system 400 is located in the upper and lower portion of the machine, more preferably between the right-hand and left-hand portions of the upper and lower portions, and cooperates with the camera module 600 which is removable from the front of the machine 10. The film marking system 700 and film numbering system 800 cooperate with the camera module 600 and are preferably located after the sensor system 200.

This embodiment may further include a footswitch 720 to activate the image marking system 700 through the electronic logical controller 1100. The electronic logical controller 1100 can also synchronize the transport system 100 in machine 10a with the transport system 100 in machine 10 so that the documents travel at an appropriate speed through the machines 10a and 10 to minimize the likelihood of jamming. The electronic logical controller 1100 can also coordinate the alphanumeric characters produced by the image numbering system 800 with the characters produced by the imprinting system 1000.

Figure 23:
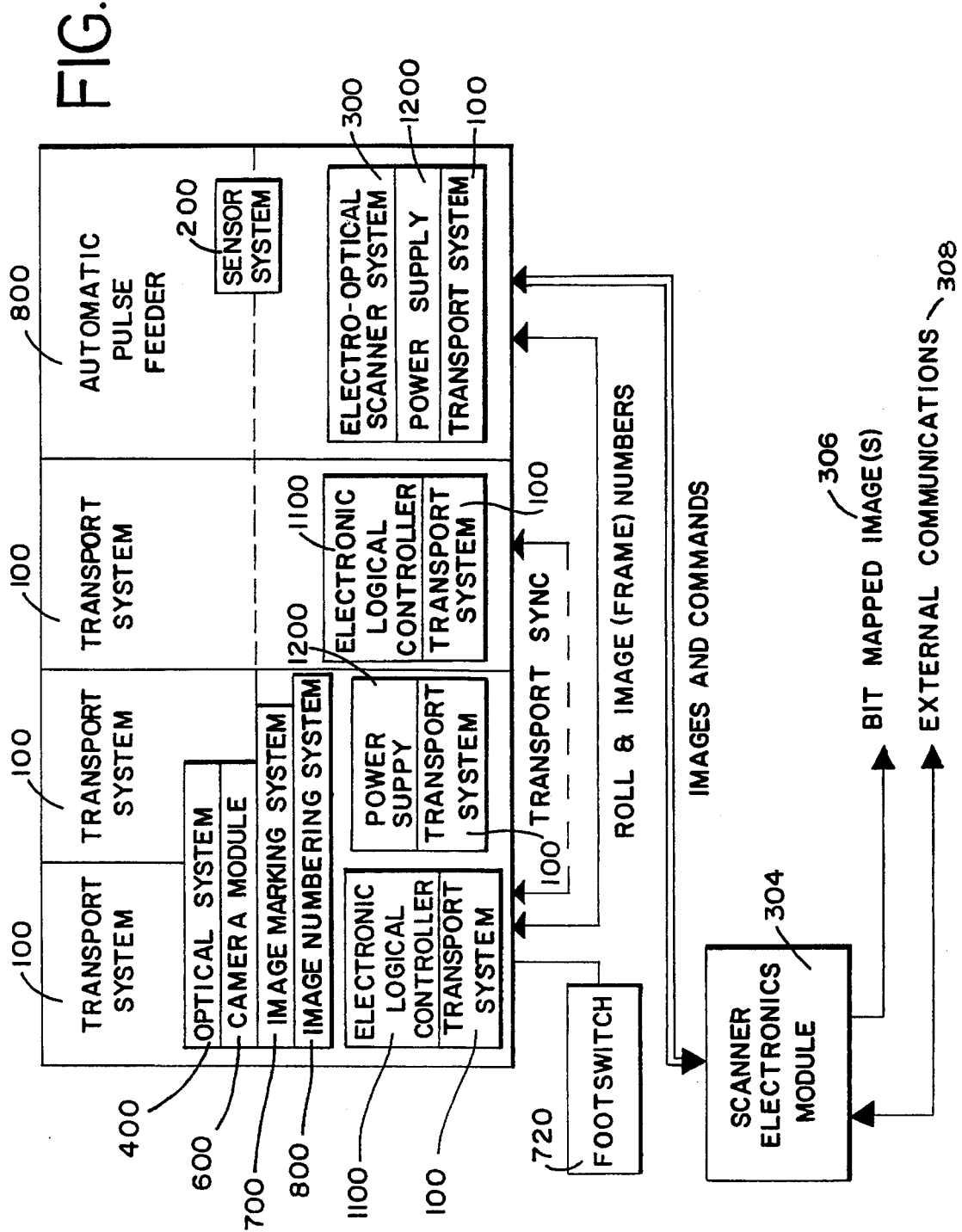
FIG. 23 is a schematic flow diagram showing another embodiment of a document processing system wherein the machine of the present invention configured as shown in FIG. 2 may be used.

FIG. 23 shows another embodiment of the system using two machines. The first machine 10a includes an automatic pulse feeder 80, a transport system 100, an electro-optical scanning system 300 to scan a single side of the document, and an electronic logical controller 1100. The second machine 10 is the same as the machine 10 described in the FIG. 22.

The document, therefore, is pulled into the machine 10a by automatic feeder 80 and a portion of the transport system 100 which moves the document in a straight line path to the electro-optical scanning system 300 to scan a single side of the document and to send the imaged signal to a scanner electronics module 304 for processing into either bit mapped images 306 or to an external communications device 308. The document is then transported by another portion of the transport system 100 to the exit of the machine 10a where the document enters the machine 10 to be filmed.

This embodiment may further include a footswitch 720 to activate the image marking system 700 through the electronic logical controller 1100. The electronic logical controller 1100 can also synchronize the transport system 100 in machine 10a with the transport system 100 in machine 10 so that the documents travel at an appropriate speed through the machines 10a and 10 to minimize the likelihood of jamming. The electronic logical controller 1100 can also coordinate the alphanumeric characters produced by the image numbering system 800 and the blips produced by the image marking system 700 with the optical scanning system 300 so that the documents can be easily indexed.

Figure 24:
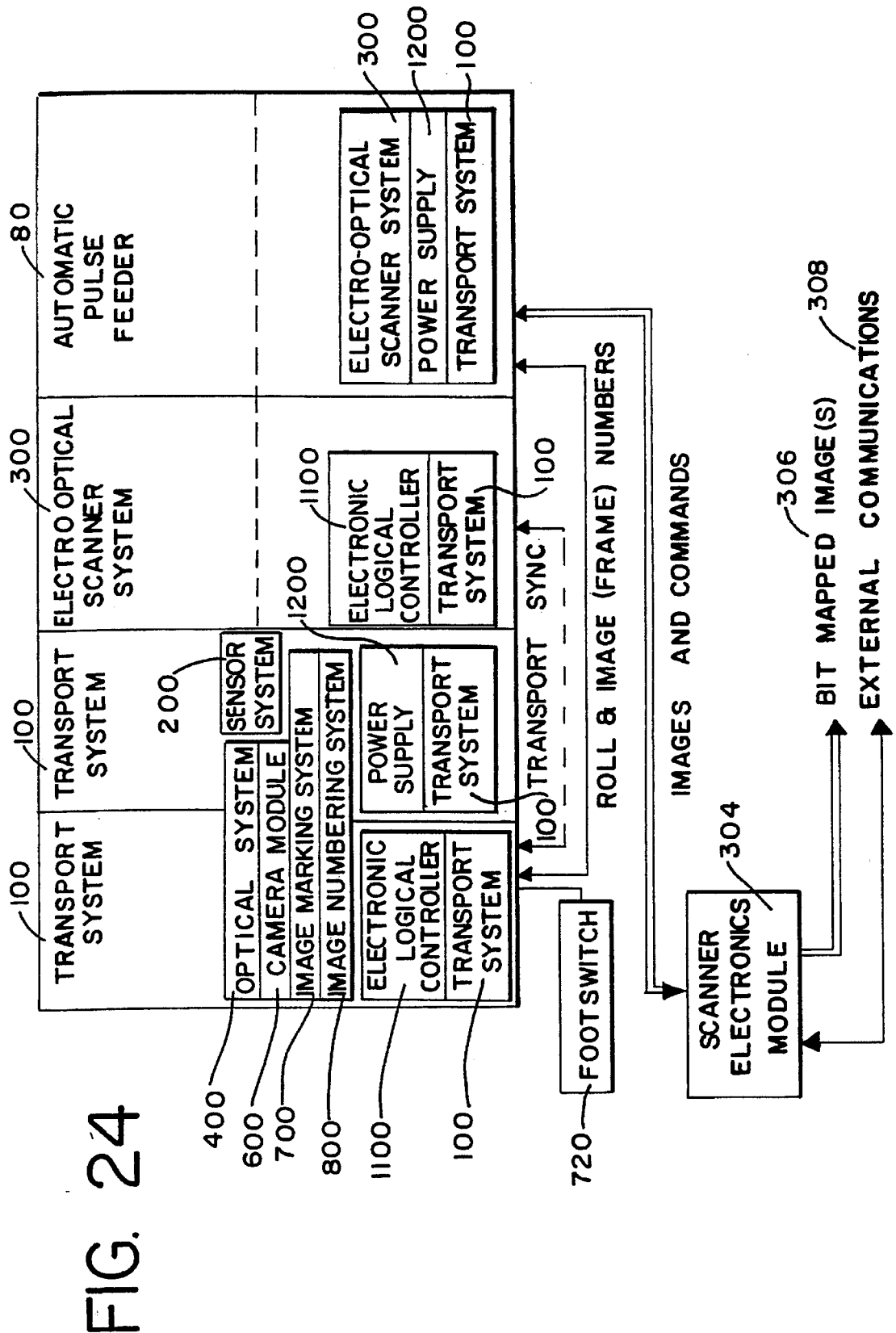
FIG. 24 is a schematic flow diagram showing another embodiment of a document processing system wherein the machine of the present invention configured as shown in FIG. 2 may be used.

FIG. 24 shows another embodiment of the document processing system where the electro-optical scanning system 900 provided in machine 10a can scan both sides of the document. In this embodiment, a portion of the electro-optical scanning system 300 is located in the lower right-hand portion, with the balance located in the upper left-hand portion. In this way, the document is pulled into the machine 10a by automatic feeder 80 and a portion of the transport system 100, which moves the document in a straight line path to a portion of the scanning system 300 to scan one side of the document, and then moves the document to the other portion of the scanning system to scan the other side of the document. The output of both portions of the scanning system is sent to the scanner electronics module 304 for processing into either bit mapped images 306 or to an external communications device 308. The document is then transported by another portion of the transport system 100 to the exit of the machine 10a to then enter machine 10 which is the same as that described in FIG. 23.

Figure 25:
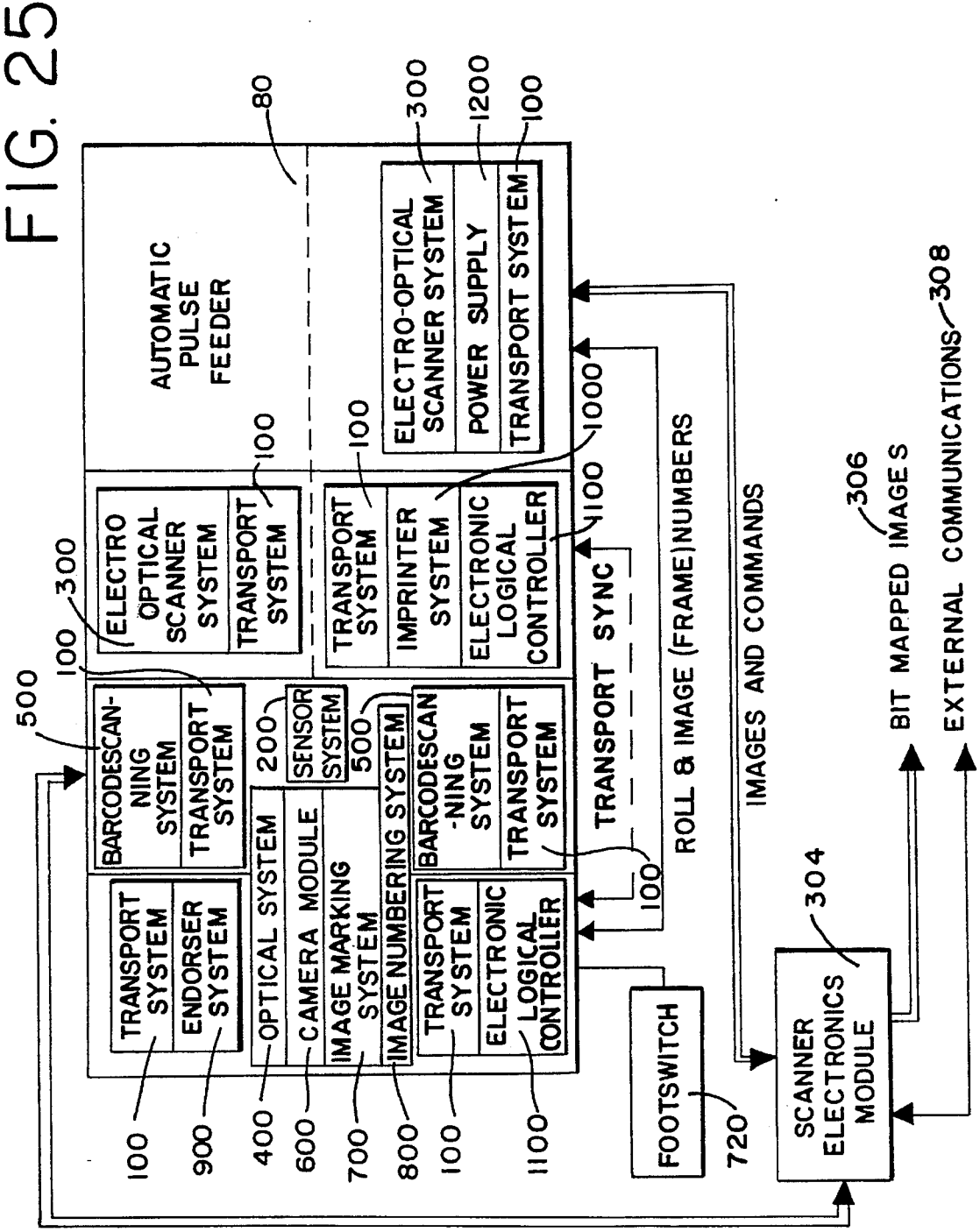
FIG. 25 is a schematic flow diagram showing another embodiment of a document processing system wherein the machine of the present invention configured as shown in FIG. 2 may be used.

FIG. 25 shows another embodiment of the system using two machines. The first machine 10a includes an automatic pulse feeder 80, a transport system 100, an electro-optical scanning system 300 to scan both sides of the document, an imprinting system 1000, and an electronic logical controller 1100. The second machine includes a transport system 100, a sensor system 200, a bar code scanner 500, an optical system 400 to cooperate with a camera module 600, a film marking system 700, a film numbering system 800, and an electronic logical controller 1100.

The document is pulled into the machine 10a by automatic feeder 80 and a portion of the transport system 100 which moves the document in a straight line path to the sensor system 200 which senses the presence of a document and also sends a signal to the electronic logical controller 1100 to control the imprinting system 1000 so that when the document reaches the imprinting system the characters are imprinted on the document. After passing the sensor system 200, the document is transported through a portion of the scanning system 300 where one side of the document is scanned, and then transported to the other portion of the scanning system where the other side of the document is scanned. The output of both portions of the scanning system is sent to the scanner electronics module 304 for processing into either bit mapped images 306 or to an external communications device 308. The document is then transported by another portion of the transport system 100 to the imprinting system 1000 where characters are printed onto the document. The document is then transported to the exit of the machine 10a where the document enters the machine 10.

Upon entering the machine 10, the document passes the sensor system 200 and is transported to the bar code scanning system 500 where the bar code symbology on the document is read and a signal representing the bar code is sent to the bar code electronics module 510 where the signal is processed or stored. The document is then transported to the optical system to be filmed and the film is marked and numbered as fully described above after which the document passes through the endorsing system to be endorsed and then to the exit of the machine 10.

This embodiment may further include a footswitch 720 to activate the image marking system 700 through the electronic logical controller 1100. The electronic logical controller 1100 can also synchronize the transport system 100 in machine 10a with the transport system 100 in machine 10 so that the documents travel at an appropriate speed through the machines 10a and 10 to minimize the likelihood of jamming. The electronic logical controller 1100 can also coordinate the alphanumeric characters produced by the image numbering system 800 and the blips produced by the image marking system 700 with the optical scanning system 300 so that the documents can be easily indexed.

Figure 26:
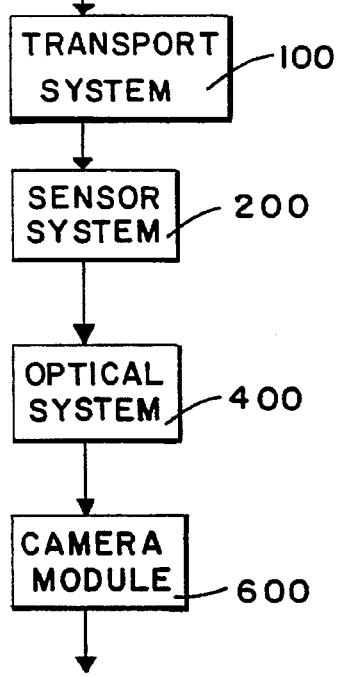
FIG. 26 is a flow diagram of an embodiment of a document processing system.

While FIGS. 16 through 25 show preferred schematic flow diagrams of document processing systems in which the machines of FIGS. 1 and 2 can be used, the present invention also contemplates a document processing system having a straight line document path wherein a machine or machines and wherein the specific systems other than those shown in FIGS. 1 through 14 can be used. Accordingly, FIGS. 26 through 32 present flow diagrams of several embodiments of a document processing system having a straight line document path. In particular, FIG. 26 shows a document processing system having a straight line document path and including a transport system 100, a sensor system 200, an optical system 400 and a camera module 600. In this embodiment, the documents 1 are fed and moved in a straight line document path by the transport system 100 through the sensor system 200 and the optical system 400 where the image of the document is projected to the camera module 600 and captured on microfilm.

Figure 28:
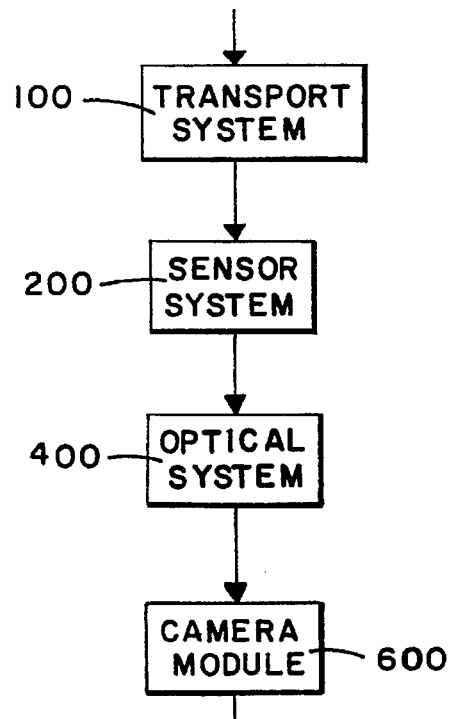
FIG. 28 is a flow diagram of an embodiment of a document processing system.
Figure 27:
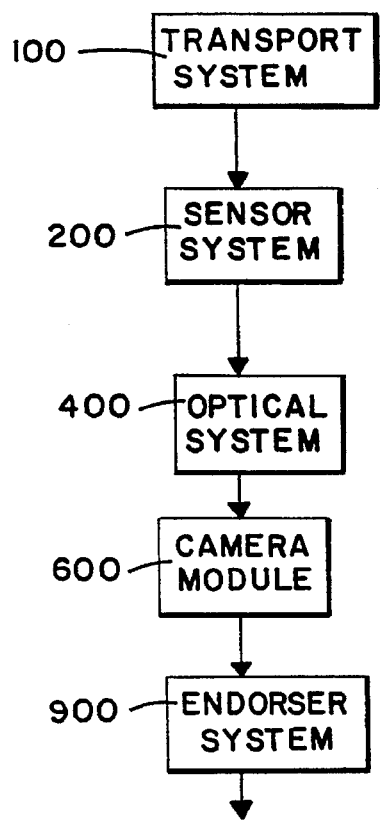
FIG. 27 is a flow diagram of an embodiment of a document processing system.

FIG. 27 shows another embodiment of a document processing system wherein the embodiment depicted in FIG. 26 further includes an endorser system 900 after the camera module to stamp an incremental endorsement on the document as it travels past the endorser system. FIG. 28 shows another embodiment of a document processing system wherein the embodiment depicted in FIG. 26 further includes a film numbering system 800, a film marking system 700, and an endorser system 900.

Figure 29:
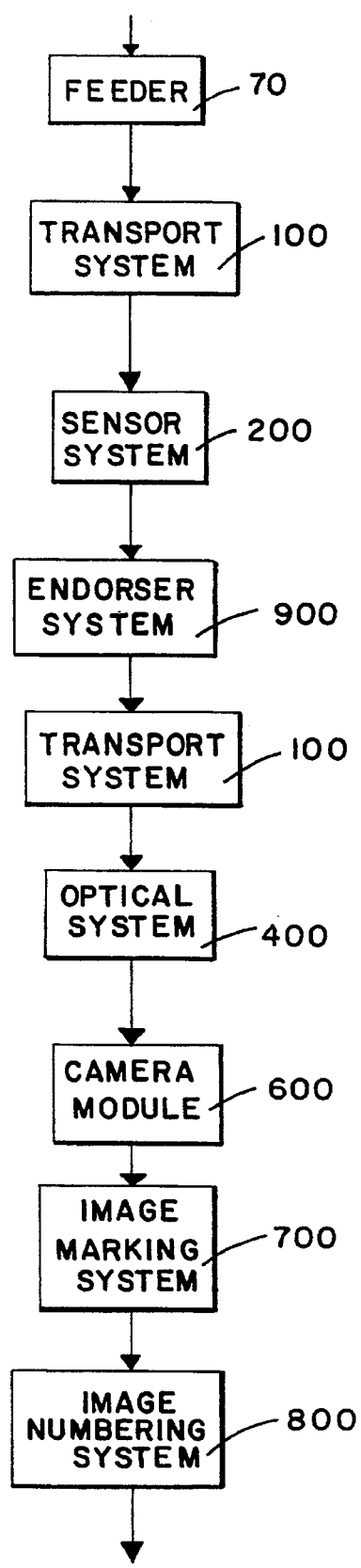
FIG. 29 is a flow diagram of an embodiment of a document processing system.
Figure 30:
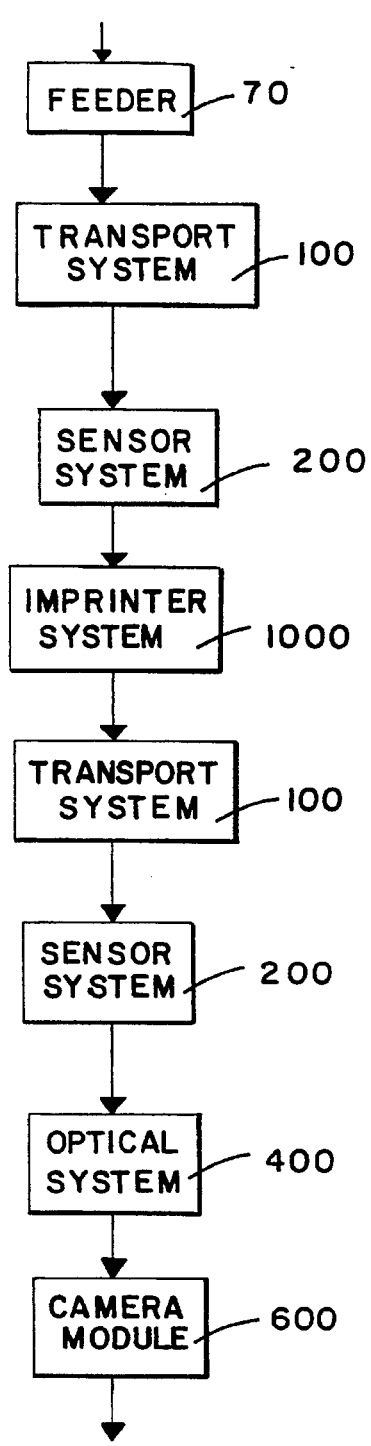
FIG. 30 is a flow diagram of an embodiment of a document processing system.

FIG. 29 shows a document processing system having a feeder 70, a portion of a transport system 100 for transporting the documents in a straight line path 100, a sensor system 200 for sensing the presence of a document, an endorser system 900, another portion of the transport system 100, an optical system 400 for projecting the image of the document to a camera module 600, an image marking system 700, and an image numbering system 800. FIG. 30 shows a document processing system having a feeder 70, a portion of a transport system 100 for transporting the documents in a straight line path, a sensor system 200, an imprinter system 1000 for imprinting alpha-numeric characters on the document, another portion of a transport system 100, a sensor system 200, an optical system 400, and a camera module 600.

FIG. 31 shows a document processing system including a pulse feeder 80, a transport system 100 for transporting the documents in a straight line document path, an electro-optical scanner system 300 for obtaining the image of the document processing it in the scanner electronics module 304 to provide, for example, a bit mapped image 306 or selective binary or digital output for use with external communications 308 equipment, another portion of the transport system 100, a sensor system 200, an optical system 400, a camera module 600, an image marking system 700, and an image numbering system 702.

FIG. 32 shows another embodiment of a document processing system having a pulse feeder 80, a transport system 100, an electro-optical scanning system 300 with a scanner electronics module 304, an imprinter system 1000, a bar code scanning system 500 for reading bar code symbologies printed on the documents, an optical system 400, a camera module 600, an image marking system 700, an image numbering system 800, and an endorser system 900.

While the preferred embodiments of this invention are illustrated, it will be understood that the invention is not limited to the illustrated embodiments. Those skilled in the art to which the invention pertains may make modifications and other embodiments employing the principles of the invention, particularly upon considering the foregoing teachings.

What is claimed is:

1. A document processing apparatus with an inlet and an outlet comprising:

a document transport system having opposed transport members for moving documents serially along a generally straight line document path from the inlet to the outlet;

an optical system located between the inlet and the outlet and having a first pair of mirrors to direct the image from one side of the document at a first location along the length of said document to an aperture, said optical system having a second pair of mirrors to direct the image from the other side of the document at said first location along the length of said document; and, a removable camera module having a lens with an optical axis and film such that when the camera is attached to the apparatus, the lens is aligned with the aperture to receive the image from the optical system.

2. The apparatus of claim 1 wherein at least one mirror is generally orthogonal to the direction of movement of the document through the optical system.

3. The apparatus of claim 1 further comprising:

an upper portion and a lower portion to define an area of travel for the document; and, the optical system being located in the lower portion and further having said second pair of mirrors located in the upper portion to direct the image from the other side of the document to an aperture orthogonal to the document path.

4. The apparatus of claim 3 wherein the lens is oriented with its optical axis generally orthogonal to the direction of movement of the document through the optical system.

5. The apparatus of claim 1 further comprising a film drive system such that the film moves in a direction opposite the direction of the document moving through the optical system.

6. The apparatus of claim 5 wherein the film moves at a speed proportioned to the document's speed to provide the apparent effect that both are stationary with respect to each other, 7. The apparatus of claim 1 further comprising a film drive system such that the film is exposed to the image of said one side of said document at said first location along said document and the image of said other side of said document at said first location along said document at approximately the same time.

8. The apparatus of claim 1 wherein said image is directed from said first location as said first location of said document passes over a glass imaging region.

9. The apparatus of claim 8 wherein said document transport system includes members to positively control movement of said document as said first location of said document passes over said glass imaging region.

10. The apparatus of claim 9 wherein said positive control system members of said document transport system further comprise a series of pairs of contacting rollers, said rollers acting to control transport of said document on the inlet and outlet sides of said glass imaging region.

11. A document processing apparatus with an inlet and an outlet comprising:

a document transport system having opposed transport members for moving documents serially along a generally/straight line document path from the inlet to the outlet;

an optical system located between the inlet and the outlet and having a pair of mirrors to direct the image from one side of the document to an aperture orthogonal to the document path; and, a removable camera module having a lens with an optical axis and film such that when the camera is attached to the apparatus, the lens is aligned with the aperture to receive the image from the optical system; and an endorser system located downstream of the optical system for placing a single imprint endorsement mark on the document.

12. The apparatus of claim 11 wherein the endorser system is movable with respect to the apparatus to permit placement of a single endorsement mark in a second location on the document, 13. A document processing apparatus with an inlet and an outlet comprising:

a document transport system having opposed transport members for conveying documents serially along a generally straight line document path from the inlet to the outlet;

an upper portion hinged to a lower portion to define an area of document travel;

an optical system located between the inlet and the outlet and comprising:

a first light source located in the upper portion to direct light from one side of a document at a first location along the length of said document through a first pair of mirrors to an aperture orthogonal to the document path;

a second light source located in the lower portion to direct light from the other side of the document at said first location along the length of said document through a second pair of mirrors to an aperture orthogonal to the document path; and a removable camera module having a lens with an optical axis and film such that when the camera module is attached to the apparatus, the lens is aligned with the aperture to receive the image from the optical system.

14. A document processing apparatus comprising:

a housing having a top portion and bottom portion, each having a front, a rear, a first side, and a second side, with the rear of the top portion hinged to the rear of the bottom portion and the first side defining an inlet and the second side defining an outlet;

a document transport system having transport members located in the top portion and bottom portion for conveying documents serially along a generally straight line document path from the inlet to the outlet, said document transport system having a series of pairs of contacting rollers, said rollers acting to positively control transport of said document between said rollers from said inlet to said outlet;

an optical system located between the inlet and the outlet and having mirrors to direct the images from both sides of the document at a single imaging location along the document to an aperture orthogonal to the document path; and, a removable camera module having a lens with an optical axis and film such that when the camera module is attached to the apparatus, the lens is aligned with the aperture to receive the images from the optical system and to record the images from both sides of the document adjacent to one another at a single filming location along the length of film.

15. The document processing apparatus of claim 14 wherein said transport system includes a pair of upper and lower front transport rollers located on the inlet side of said imaging location and a pair of upper and lower rear transport rollers located on the outlet side of said imaging location, said pairs of front and rear transport rollers simultaneously contacting said document as said document passes across said imaging location.

16. The document processing apparatus of claim 15 further comprising an endorsing system for placing a single imprint endorsement mark on the document at an endorsement location, said pairs of front and rear transport rollers simultaneously contacting said document as said document passes said endorsement location.

17. The document processing apparatus of claim 16 further comprising a pair of upper and lower exit rollers, said pair of upper and lower exit rollers simultaneously contacting said document as said document passes said imaging location and said endorsement location and as said pairs of front and rear transport rollers simultaneously contact said document.

18. The document processing apparatus of claim 17 wherein said film moves at a speed proportioned to the document's speed to provide the apparent effect that both are stationary with respect to one another.

19. A document processing system comprising: a document transport system for moving documents serially along a generally straight document path; an optical system for projecting an image of at least one side of the document; a film module having a lens orthogonal to the document path and film that moves simultaneously with the documents through an exposure region to receive the projected image, and an endorsing system for placing a single imprint endorsement mark on the document.

20. The processing system of claim 19 wherein the endorser system is movable with respect to the document path to permit placement of a single endorsement mark in a second location on the document.

21. A document processing system comprising: a document transport system to serially transport documents along a straight line document path; a sensing system to sense the presence of a document; an imprinting system for imprinting characters on one side of the document; a bar code scanning system for scanning a bar code that is located on the document; an optical system for projecting an image of at least one side of the document; a film module having a lens orthogonal to the document path and film that moves simultaneously with the documents through an exposure region to receive the projected image; a marking system for providing a blip on the film; a numbering system for providing alphanumeric characters on the film; and an endorsing system for printing a single endorsement.

22. The system of claim 21 wherein the sensing system counts the documents.

23. The system of claim 21 wherein the endorser system is movable with respect to the document path to permit placement of a single endorsement mark in a second location on the document.

* * * * *